(12) United States Patent
Hayashi et al.

(10) Patent No.: US 7,799,391 B2
(45) Date of Patent: Sep. 21, 2010

(54) LIQUID CRYSTAL COMPOSITION, COLOR FILTER AND LIQUID CRYSTAL DISPLAY

(75) Inventors: Shinji Hayashi, Saitama (JP); Norihisa Moriya, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 181 days.

(21) Appl. No.: 12/085,655

(22) PCT Filed: Jun. 15, 2007

(86) PCT No.: PCT/JP2007/062170
§ 371 (c)(1),
(2), (4) Date: May 29, 2008

(87) PCT Pub. No.: WO2007/145339
PCT Pub. Date: Dec. 21, 2007

(65) Prior Publication Data
US 2009/0195734 A1 Aug. 6, 2009

(30) Foreign Application Priority Data

| Jun. 15, 2006 | (JP) | ............................... 2006-165543 |
| Jun. 15, 2006 | (JP) | ............................... 2006-165850 |
| Jun. 15, 2006 | (JP) | ............................... 2006-166438 |
| Jun. 15, 2006 | (JP) | ............................... 2006-166716 |

(51) Int. Cl.
*C09K 19/38* (2006.01)
*C09K 19/54* (2006.01)
*C09K 19/52* (2006.01)
*G02B 5/20* (2006.01)
*G02B 5/30* (2006.01)
*G02F 1/1335* (2006.01)
*G02F 1/13363* (2006.01)

(52) U.S. Cl. ................... 428/1.1; 428/1.3; 252/299.01; 252/299.5; 349/106; 349/117; 349/183; 430/20; 430/46.3

(58) Field of Classification Search ............ 252/299.01, 252/299.5; 428/1.1, 1.3; 349/106, 183, 117; 430/20, 46.3
See application file for complete search history.

(56) References Cited

U.S. PATENT DOCUMENTS

| 2006/0134350 | A1* | 6/2006 | Hirai et al. | .................... 428/1.3 |
| 2006/0278851 | A1* | 12/2006 | Ito et al. | ................ 252/299.64 |
| 2008/0303985 | A1* | 12/2008 | Hayashi et al. | ............... 349/88 |

FOREIGN PATENT DOCUMENTS

| JP | A-2000-221506 | 8/2000 |
| JP | A-2002-265421 | 9/2002 |
| JP | A-2002-308832 | 10/2002 |
| JP | A-2003-306491 | 10/2003 |
| JP | A-2005-024920 | 1/2005 |
| JP | A-2006-126757 | 5/2006 |

OTHER PUBLICATIONS

K. Okano et al., Liquid Crystal = Applied Edition, Baifukan Co., Ltd., Jul. 20, 1985, p. 202.

* cited by examiner

*Primary Examiner*—Shean C Wu
(74) *Attorney, Agent, or Firm*—Oliff & Berridge, PLC

(57) ABSTRACT

There is provided a liquid crystal composition capable of inexpensively and easily forming a phase difference layer excellent in mechanical strength such as hardness and in substrate adhesion properties, a color filter using the same, and a liquid crystal display apparatus using the color filter. Specifically, provided are a liquid crystal composition, a color filter 1 provided with a phase difference layer 4 produced by applying the liquid crystal composition onto a transparent substrate 2 and immobilizing, and a liquid crystal display apparatus 11 using the color filter 1 as a display side substrate 12. The liquid crystal composition contains therein: one kind or two or more kinds of crosslinkable liquid crystal compounds; at least one kind of silane coupling agents selected from sulfide silane coupling agents, mercapto silane coupling agents, amino silane coupling agents and (meth)acryloyl silane coupling agents; a multifunctional (meth)acrylate having an alcoholic hydroxyl group and a multifunctional (meth)acryloyl group in a molecular structure thereof; and an alicyclic epoxy compound.

22 Claims, 2 Drawing Sheets

LIQUID CRYSTAL COMPOSITION, COLOR FILTER AND LIQUID CRYSTAL DISPLAY

TECHNICAL FIELD

The present invention relates to a liquid crystal composition, a color filter having a phase difference layer made of the liquid crystal composition, and a liquid crystal display apparatus using the color filter.

BACKGROUND ART

Recently, liquid crystal display apparatuses have the large advantages of thin-type, small weights and low consumption of electric power, and thus are actively used for display apparatuses of personal computers, cellular phones, electronic organizers and the like. The liquid crystal display apparatuses utilize the birefringence of driving liquid crystal materials to perform switching of light. Thus, the liquid display apparatus has the problem of view angle dependency attributable to the birefringence of driving liquid crystal materials. For the resolution of the problem, a variety of phase difference layer forming films have been developed. The phase difference forming film is normally fabricated by stretching of film made of polyacrylate, polycarbonate, triacetyl cellulose and the like, and is placed outside a liquid crystal cell. The phase difference layer forming film is normally stuck by an adhesive to the outside of a liquid crystal cell formed by sandwiching a driving liquid crystal material between two substrates. A refractive index of the adhesive differs from that of a phase difference layer forming film, thereby posing a problem in that the former film causes irregular refraction on the surface of a display.

On the other hand, recently, in a color film produced by laminating on a base material a colored layer that colors transmission light such as red (R), green (G) and blue (B) light, a method is proposed that applies a crosslinkable liquid crystal material or a polymer liquid crystal material to the top face of the colored layer to place a phase difference layer inside a liquid crystal cell (see Patent Literature No. 1). In this case, there is no need for an adhesive, so that the problem of the above light scattering is not posed, and a high mechanical strength and heat resistance are obtained because of the phase difference layer being protected by the substrate and further moisture absorption can be restrained.

Moreover, for further improvement of heat resistance and chemical resistance on the phase difference layer, a method is proposed that adds multifunctional (meth)acrylate (see Patent Literature No. 2 and Patent Literature No. 3) to a polymerizable liquid crystal.

Patent Literature No. 1: Japanese Patent Application Laid-Open (JP-A) No. 2000-221506

Patent Literature No. 2: JP-A 2002-265421

Patent Literature No. 3: JP-A 2002-308832

DISCLOSURE OF INVENTION

Problems to be Solved by the Invention

However, as in Patent Literature No. 2 and Patent Literature No. 3 above, a method of only adding multi(meth)acrylate to a polymerizable liquid crystal makes weak the adhesion of a phase difference layer to a base layer such as a base material or a colored layer, thereby posing the problem of peeling the phase difference layer from the base layer by stress from the outside. The present invention has been made in consideration of the above problems, and an object of the invention is to provide a liquid crystal composition capable of inexpensively and easily forming a phase difference layer excellent in hardness and adhesion properties to a base layer, a color filter using the composition and a liquid crystal display apparatus using the color filter.

Means for Solving the Problems

A liquid crystal composition according to the present invention is based on the findings of improving the perpendicular orientation properties and hardness of a phase difference layer by addition of a specific silane coupling agent and an alcoholic multifunctional compound as additives to a crosslinkable liquid crystal compound and further improving the endurance synergistically with the above additives by blending of an epoxy compound and improving adhesion properties to a base layer (hereinafter, sometimes referred to as "substrate adhesion properties" in the present invention).

According to a first aspect of the present invention, there is provided a liquid crystal composition including: one kind or two or more kinds of crosslinkable liquid crystal compounds; at least one kind of silane coupling agents selected from sulfide silane coupling agents, mercapto silane coupling agents, amino silane coupling agents and (meth)acryloyl silane coupling agents; a multifunctional compound having an alcoholic hydroxyl group and a polymerizable functional group in a molecular structure thereof; and an epoxy compound.

In the liquid crystal composition, at least one kind of the crosslinkable liquid crystal compounds may have one or two or more (meth)acryloyl groups in one molecule.

In the liquid crystal composition, the amino silane coupling agent may be a ketimine silane coupling agent.

In the liquid crystal composition, the multifunctional compound may be a multifunctional (meth)acrylate.

In the liquid crystal composition, the multifunctional (meth)acrylate may be one kind or two or more kinds selected from the group consisting of 2-hydroxy-1-3-dimethacryloxypropane, 2-hydroxy-1-3-dimethacryloxypropane, 2-hydroxy, 1-acryloxy-3-methacryloxypropane, ethylenebis[oxy (2-hydroxypropane-1,3-diyl)]dimethacrylate, (1-methyl-1, 2-ethanediyl)bis[oxy(2-hydroxy-3,1-propanediyl)] diacrylate, bisphenol-A-glycidyl methacrylate, bisphenol-A-glycidyl acrylate and pentaerythritoldiacrylate monostearate.

In the liquid crystal composition, the multifunctional (meth)acrylate may be pentaerythritol triacrylate.

In the liquid crystal composition, the multifunctional (meth)acrylate may be dipentaerythritol hydroxy pentaacrylate.

In the liquid crystal composition, the epoxy compound may be an alicyclic epoxy compound having an epoxy group within an alicyclic alkyl group.

In the liquid crystal composition, the epoxy compound may have two or more epoxy groups in the molecular structure.

In the liquid crystal composition, the epoxy compound may be contained as a low molecular weight compound.

In the liquid crystal composition, a number average molecular weight of the epoxy compound may be 1000 or less.

The liquid crystal composition may contain 0.01 to 20% by weight of the silane coupling agent in a value relative to blend conversion.

The liquid crystal composition may contain 5 to 20% by weight of the multifunctional compound in a value relative to blend conversion.

The liquid crystal composition may contain 1 to 20% by weight of the epoxy compound in a value relative to blend conversion.

According to a second aspect of the present invention, there is provided a color filter produced by directly or indirectly laminating at least a colored layer and a phase difference layer on a transparent substrate in this order or in reverse order, wherein the phase difference layer is formed by crosslinking polymerization of crosslinkable liquid crystal compounds with each other in a state in which the crosslinkable liquid crystal compounds contained in the liquid crystal composition recited in the first aspect are oriented.

According to a third aspect of the present invention, there is provided a color filter produced by directly or indirectly laminating a colored layer and a phase difference layer on a transparent substrate in this order, wherein the phase difference layer is formed by directly applying the liquid crystal composition recited in the first aspect onto the colored layer to form a liquid crystal coating film, orienting the crosslinkable liquid crystal composition contained in the liquid crystal coating film, and then irradiating the surface of the liquid crystal coating film with active radiation rays to start crosslinking polymerization of the crosslinkable liquid crystal compounds with each other.

According to a fourth aspect of the present invention, there is provided a color filter produced by directly or indirectly laminating a colored layer and a phase difference layer on a transparent substrate in this order, wherein the phase difference layer is formed by directly applying the liquid crystal composition recited in the first aspect onto the colored layer to form a liquid crystal coating film, the liquid crystal composition containing therein at least (a) 70 to 93.89% by weight of the crosslinkable liquid crystal compound, (b) 0.1 to 10% by weight of a photopolymerization initiator, (c) 0.01 to 20% by weight of the silane coupling agent, (d) 5 to 20% by weight of the multifunctional compound and (e) 1 to 20% by weight of the epoxy compound in values relative to blend conversion (provided that the total amount of (b) to (e) above does not exceed 30% by weight), orienting the crosslinkable liquid crystal compounds contained in the liquid crystal coating film, and then irradiating the surface of the liquid crystal coating film with active radiation rays to start crosslinking polymerization of the crosslinkable liquid crystal compounds with each other, and further baking the above crosslinked liquid crystal film, and the pencil hardness of the phase difference layer is 2H or higher tin accordance with the evaluation criteria of JIS K 5600-5-4.

According to a fifth aspect of the present invention, there is provided a color filter produced by directly or indirectly laminating a colored layer and a phase difference layer on a transparent substrate in this order, wherein the phase difference layer is formed by directly applying the liquid crystal composition recited in the first aspect onto the colored layer to form a liquid crystal coating film, the liquid crystal composition containing therein at least (a) 70 to 93.89% by weight of the crosslinkable liquid crystal compound, (b) 0.1 to 10% by weight of a photopolymerization initiator, (c) 0.01 to 20% by weight of the silane coupling agent, (d) 5 to 20% by weight of the multifunctional compound and (e) 1 to 20% by weight of the epoxy compound in values relative to blend conversion (provided that the total amount of (b) to (e) above does not exceed 30% by weight), orienting the crosslinkable liquid crystal compounds contained in the liquid crystal coating film, and then irradiating the surface of the liquid crystal coating film with active radiation rays to start crosslinking polymerization of the crosslinkable liquid crystal compounds with each other, and further baking the above crosslinked liquid crystal film, and the detachment strength of the phase difference layer is 0 or 1 in accordance with the evaluation criteria of JIS K 5600-5-6.

In the colored filter, the phase difference layer may be homeotropically oriented.

According to a sixth aspect of the present invention, there is provided a liquid crystal display apparatus, including: the color filter; and a driving circuit side substrate provided with at least liquid crystal driving electrodes on a transparent substrate, wherein the color filter and the driving circuit side substrate face each other with the phase difference layer and the liquid crystal driving electrodes being inside, and a driving liquid crystal material is enclosed between the color filter and the driving circuit side substrate.

Some terms used in the present specification are defined in the following.

The term "(meth)acryloyl group" is used as a general term of two functional groups, i.e., an "acryloyl group" and a "methacryloyl group". Additionally, an example of the acryloyl group is an acrylate group (acryloyoxy group), and an example of the methacryloyl group is a methacrylate group. Similarly, the term "meth(acrylate)" means "acrylate" and "methacrylate".

A "liquid crystal composition" means both (a) a composition (mixture form composition) of a mixture including at least a crosslinkable liquid crystal compound, sulfide, mercapto, amino or (meth)acryloyl silane coupling agent, an alcoholic multifunctional compound and an epoxy compound and further having blended therein other substances used for forming a phase difference layer, and (b) a composition (solution form composition) in a solution state prepared by dissolving or suspending the above mixture as a blend component in a solvent. In addition, herein, a liquid crystal composition of the present invention that is a "composition in a solution state" particularly described above is also called a "liquid crystal composition solution" for convenience sake.

The term "value relative to blend conversion" stands for a weight ratio of each blend based on 100 of the total weight of blends blended as substances constituting the mixture, when a liquid crystal composition of the invention is the mixture form composition. The term stands for a weight ratio of each blend based on 100 of a weight (i.e., the total weight of blends prior to dissolving or suspending it in a solvent) obtained by subtracting the weight of the solvent from the weight of the solution, when a liquid crystal composition of the invention is a solution form composition. In the description of the specification below, the term "% by weight" means the relative to blend conversion value unless otherwise specified.

The term "phase difference layer" means a layer having a phase difference control function capable of optically compensating a phase difference (retardation) change of light.

The term "homeotropic orientation" refers to an orientation state in which an optical axis of liquid crystal molecules constituting a phase difference layer is perpendicular or substantially perpendicular to the surface of a substrate. In addition, the phrase "a phase difference layer homeotropically orientates" refers to a state in which liquid crystal molecules constituting a phase difference layer orientates perpendicular to the surface of a substrate. Additionally, in the present invention, an ideal homeotropic orientation of a phase difference layer refers to a case where a refraction index nx of the x axis direction has substantially the same value as that of a refraction index of the y direction and a phase difference value in a case of a measurement angle of 0° is 4 nm or less, preferably, 3.5 nm or less, and more preferably 3 nm or less, when the thickness direction of a phase difference layer is taken as the z axis and the xyz Cartesian coordinate is considered.

ADVANTAGEOUS EFFECT OF THE INVENTION

A phase difference layer obtained by applying a liquid crystal composition of the invention onto a base material such as a glass substrate to form a liquid crystal coating film, orienting liquid crystal molecules contained in the liquid crystal coating film, and then curing the liquid crystal coating film is excellent in hardness and adhesion properties between the base material and the base layer. Because of this, a color filter in which a phase difference layer is formed with a liquid crystal composition of the present invention or a liquid crystal display apparatus using the color filter as a display side substrate is inexpensively fabricated and has the effects of an excellent view angle improvement over a long period of time and exhibition of hardness and adhesion properties to the base material.

Additionally, a liquid crystal composition of the present invention is improved in perpendicular orientation properties of liquid crystal molecules by addition of a sulfide, mercapto, amino or (meth)acryloyl silane coupling agent to a crosslinkable liquid crystal compound. Hence, even when it is difficult to well obtain perpendicular orientation properties of liquid crystal molecules, for example, in the case of subjecting the surface of a base layer such as a base material or colored layer to cleaning treatment or surface modification treatment, the liquid crystal molecules can be perpendicularly oriented without use of a perpendicular orientation film.

Furthermore, according to the invention, the use of a multifunctional compound having a hydroxyl group and a multifunctional group heightens the effect of compatibility between a crosslinkable liquid crystal compound and the above silane coupling agent.

From the viewpoint of improving adhesion properties of a base layer and a phase difference layer produced by polymerization immobilizing liquid crystal molecules contained in a liquid crystal composition, for example, a method of separately forming an adhesive layer between the base layer and the phase difference layer may be adopted. However, in such a method, prior to the formation of a phase difference layer, a step of applying an adhesive layer onto a base layer and immobilizing needs to be passed. Additionally, in such a method, not only the thicknesses of a color filter and an entire liquid crystal display apparatus increase, but also the adhesive layer scatters transmitted light, so that optical properties of a color filter and so forth are decreased in some cases. On the contrary, mixing of the above specified silane coupling agent with a liquid crystal composition like the present invention can heighten the above effects without any of the problems of an increase in the number of fabrication steps of a phase difference layer, an increase in the thickness of a phase difference layer and a decrease in optical properties.

Moreover, a phase difference layer obtained by use of a liquid crystal composition of the present invention is excellent in orientation stability as mentioned above, and thus exhibits an excellent phase difference control function to largely contribute to a view angle improvement effect of a liquid crystal display apparatus. That is, the observation of a color filter of the present invention under a polarizing microscope does not find light leakage while the color filter is sandwiched between a pair of linear polarizing plates placed in a cross Nicols state. Further, use of the color filter in a liquid crystal display apparatus provides a dim display (black display) without light leakage and clear display of luminance (white display), and thus can provide a high quality display attributable to a high contrast ratio.

EXPLANATION OF NUMERALS

Figure 1:
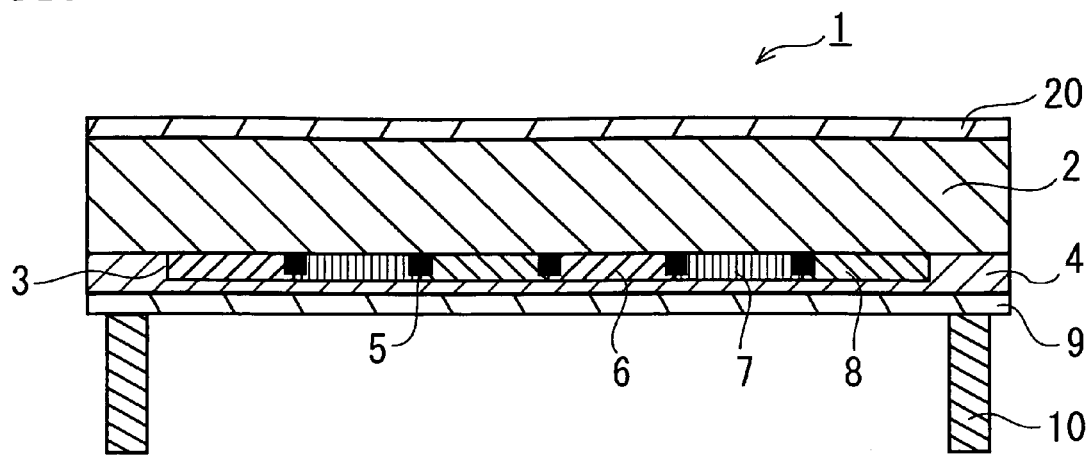
FIG. 1 is a longitudinal section indicating one example of a color filter of the present invention.

1 Color filter
2 Transparent substrate
3 Colored layer
4 Phase difference layer
11 Liquid crystal display apparatus
12 Display side substrate
13 Driving circuit side substrate
14 Driving liquid crystal material
15 Liquid crystal cell

DESCRIPTION OF THE PREFERRED EMBODIMENTS

A crosslinkable liquid crystal composition of the present invention (hereinafter, may be simply called "liquid crystal composition") is produced by adding (1) crosslinkable liquid crystal compounds, (2) at least one kind of silane coupling agents selected from sulfide silane coupling agents, mercapto silane coupling agents, amino silane coupling agents and (meth)acryloyl silane coupling agents, (3) a multifunctional compound having an alcoholic hydroxyl group and a multifunctional group in a molecule structure thereof, and (4) an epoxy compound to (5) a solvent. The above components will be specifically set forth hereinafter.

<Crosslinking Liquid Crystal Compounds>

A crosslinkable nematic liquid crystal can be used as the crosslinkable liquid crystal compound used in a liquid crystal composition of the invention. Examples of the crosslinkable nematic liquid crystals include a monomer, oligomer, and polymer having, in one molecule, at least one polymerizable group such as a (meth)acryloyl group, epoxy group, oxetane group and isocyanate group. The crosslinkable liquid crystal compounds that can be used include one compound or two or more mixtures of the compounds expressed by general formula (1) indicated in chemical formula 1 below or expressed by general formula (2) indicated in chemical formula 2 below, one compound or two or more mixtures of the compounds indicated in chemical formula 3 or 4, or mixtures of combinations thereof. In particular, at least one kind of crosslinkable nematic liquid crystal compounds constituting a crosslinkable liquid crystal compound in the invention preferably has one or two or more (meth)acryloyl groups in one molecule.

As described above, in the invention, a sulfide, mercapto, amino or (meth)acryloyl silane coupling agent is further added to a liquid crystal composition containing a crosslinkable liquid crystal compound. As a result, when a phase difference layer is formed on the surface of a base layer such as a substrate by use of the liquid crystal compound of the invention, a crosslinkable liquid crystal compound constituting the phase difference layer can be well oriented in a direction perpendicular to the base layer. A mechanism achieving the above good perpendicular orientation is not clarified by the invention. However, the following is taken into consideration about the above mechanism. In other words, when a coating film is formed by applying the liquid crystal composition of the invention to a base layer, the amino-based silane coupling agent is present in the coating film in a dispersed form. The presence of the silane coupling agent causes a crosslinkable liquid crystal compound constituting the coating film to be well perpendicularly oriented. More specifically, the silane coupling agent exerts a good action not only on the orientation of a crosslinkable liquid crystal compound present in an interfacial region between the coating film and the base layer or in an interfacial region between the coating film and an air layer, but also on the orientation of a crosslinkable liquid crystal compound present in an intermediate region of the coating film. Therefore, even when the orientation of a crosslinkable liquid crystal compound present in the base layer interface is unstable due to the change in properties of the base layer surface or the presence of irregularities, the presence of the silane coupling agent causes a crosslinkable liquid crystal compound present in the intermediate region of the coating film to indicate a good homeotropic orientation. Under the control of a good homeotropic orientation of crosslinkable liquid crystal compounds present in the intermediate region, crosslinkable liquid crystal compounds present in the interfacial region between the coating film and the base layer or in the interfacial region between the coating film and the air layer are also considered to well homeotropically orient.

[Chemical formula 1]

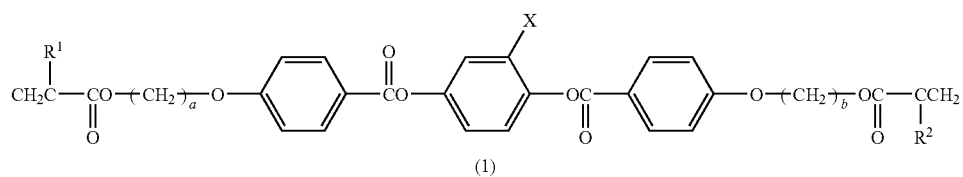

(1)

[Chemical formula 2]

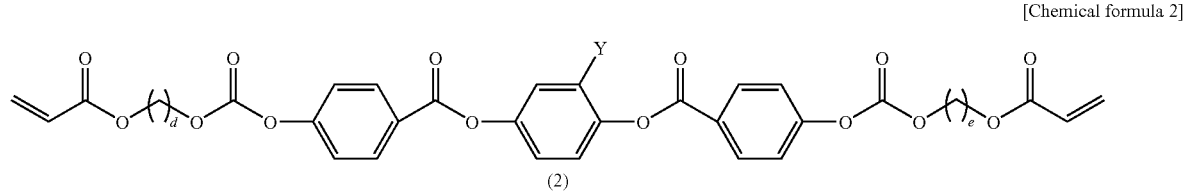

(2)

[Chemical formula 3]

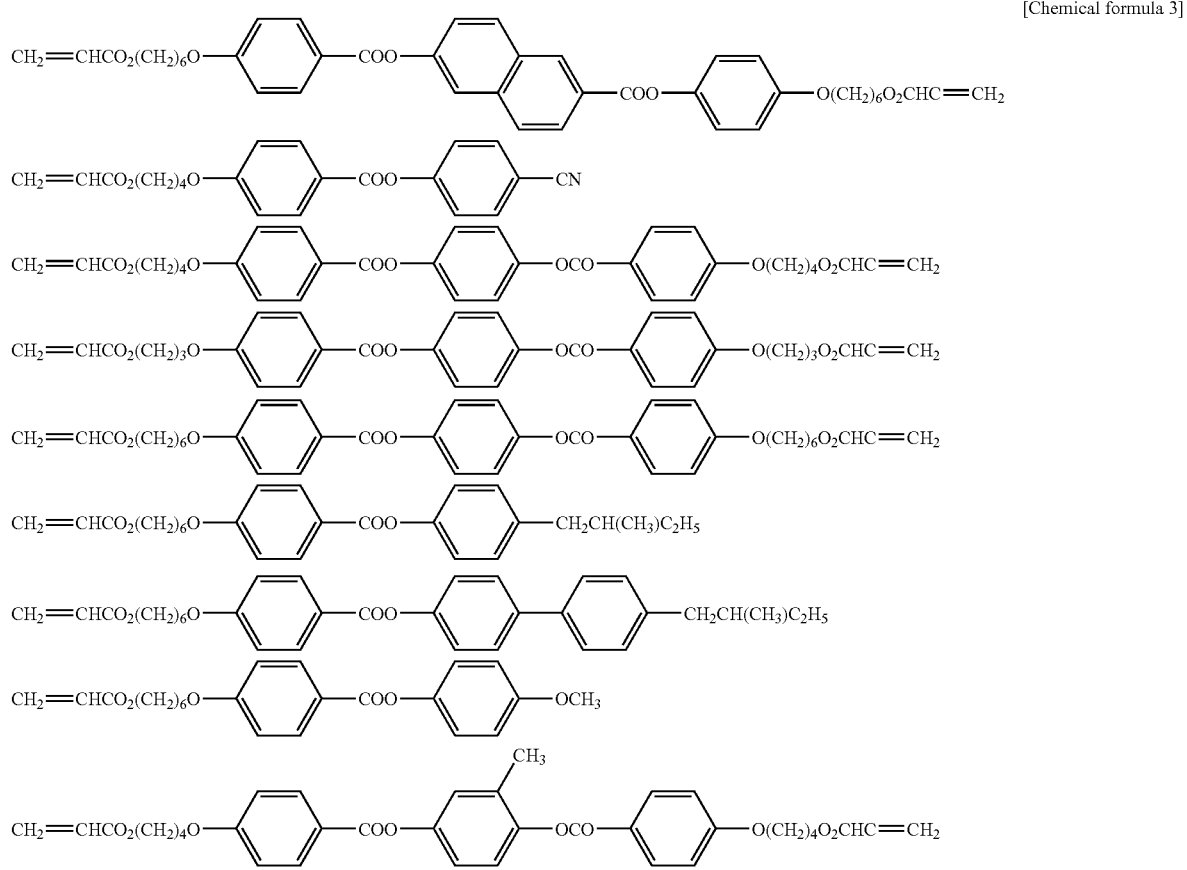

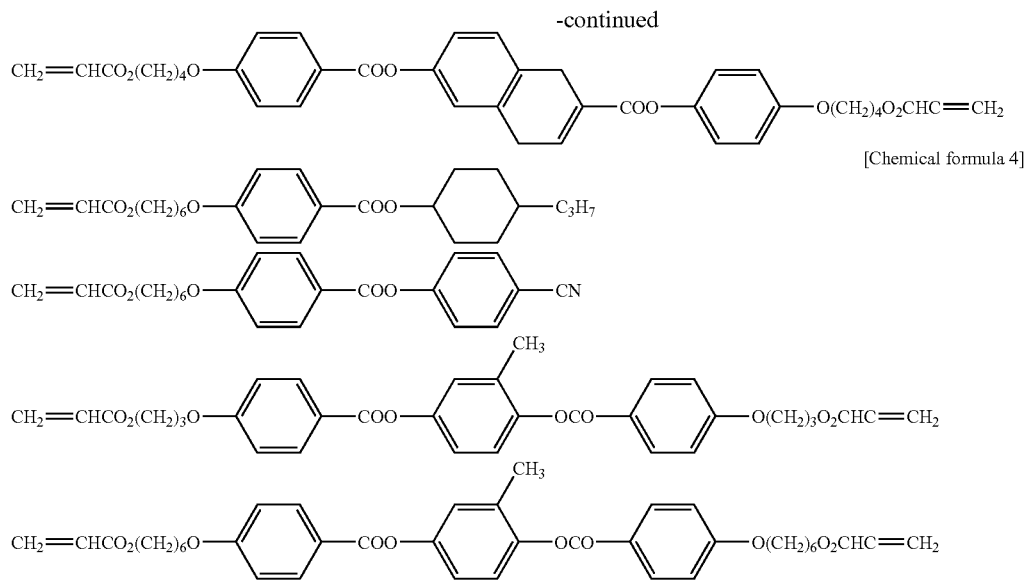

[Chemical formula 4]

In general formula (1) indicated in chemical formula 1, $R^1$ and $R^2$, indicate respectively hydrogen and a methyl group. For further widening of the temperature range in which the crosslinkable liquid crystal compound shows a liquid crystal phase, at least either $R^1$ or $R^2$ is preferably hydrogen, and the both are more preferably hydrogen atoms. Additionally, X in general formula (1) and Y in general formula (2) may be any of hydrogen, chlorine, bromine, iodine, an alkyl group having 1 to 4 carbon atoms, a methoxy group, a cyano group and a nitro group. In particular, X and Y above are preferably chlorine or a methyl group. The crosslinkable liquid crystal compounds expressed by general formulae (1) and (2) have a (meth)acryloyoxy group at both ends of a molecular chain and an alkylene group between the group and an aromatic ring positioned in an intermediate a and b and d and e indicating the chain length of the alkylene group can be each individually arbitrarily determined as integers in the range of from 2 to 12, and are preferably in the range of from 4 to 10, more preferably in the range of from 6 to 9. The compound of general formula (1) with a=b=0 or the compound of general formula (2) with d=e=0 is unstable and readily subjected to hydrolysis, and further crystallinity of the compound itself tends to be high. In addition, the compound of general formula (1) or the compound of general formula (2) with a and b or d (=e) each being 13 or more tends to be low in isotropic phase transition temperature (TI). For this reason, when the compound of general formula (1) or general formula (2) has a and b or d (=e) that are/is each 13 or more, the temperature range stably indicating crystallinity (temperature range maintaining a liquid crystal phase) becomes narrow, so that use of the compound for a liquid crystal composition of the invention is not preferable.

In chemical formulae 1 to 4 above, monomers of crosslinkable liquid crystals are illustrated. However, for example, liquid crystalline oligomers and polymers having crosslinking property can be selected as appropriate from substances used conventionally and used as crosslinkable liquid crystal compounds of the present invention.

The amount of retardation and orientation properties of a phase difference layer are generally determined by a refractive index Δn of a crosslinkable liquid crystal compound and a film thickness of the phase difference layer. For this reason, Δn of a crosslinkable liquid crystal compound is preferably in the order of 0.03 to 0.20, more preferably in the order of 0.05 to 0.15. Achieving such refractive indexes leads to the formation of a phase difference layer that can obtain a desired phase difference such as λ/4 or λ/2, by coating of a liquid crystal composition by means of a general coating apparatus when visible light having a wavelength of λ is made to pass through the phase difference layer.

In the liquid crystal composition of the invention, the crosslinkable liquid crystal compound is blended to be 70% by weight or more, preferably 75% by weight or more in a value relative to blend conversion. Making the content 70% by weight or more improves liquid crystal properties, thereby being capable of well restraining the generation of orientation failure in a phase difference layer. Accordingly, in the liquid crystal composition of the invention, the total amount of components such as a silane coupling agent, a multifunctional compound, an epoxy compound and a photopolymerization initiator, to be added to a crosslinkable liquid crystal compound, does not preferably exceed 30% by weight in a value relative to blend conversion.

However, in the case where there is a need to further add an additive for imparting a specific action to a crosslinkable liquid crystal compound or imparting a specific function to a phase difference layer formed by use of the liquid crystal composition of the invention, the amount of addition of a crosslinkable liquid crystal compound does not limit to the above-described ranges. In such a case, the amount of addition of another additive is considered and the amount of addition of a crosslinkable liquid crystal compound may be as appropriate determined. For example, it is not excluded that for the case of obtaining a so-called negative C plate generally formed by addition of a chiral agent described later, the amount of addition of a crosslinkable liquid crystal compound is less than 70% by weight.

<Positive C Plate>

Orientation of the above liquid crystal molecules perpendicular to the base layer (homeotropic orientation) to immobilize the molecules directs a light axis of the liquid crystal molecules toward the normal direction of a phase difference layer as well as can lead to the formation of a so-called positive C plate having an abnormal light-ray (extraordinary ray) refractive index larger than a usual light-ray (ordinary ray) refractive index in the normal direction of the phase difference layer. In this case, a perpendicular orientation film may be formed in advance on the coated face of a liquid crystal composition or a perpendicular orientation agent may be mixed with the liquid crystal composition.

Examples of the perpendicular orientation assistance include surface coupling agents having perpendicularly arranged alkyl chains or fluorocarbon chains such as a lecithin or quaternary ammonium surfactant, HTAB (hexadecyl-trimethylammonium bromide), DMOAP (N,N-dimethyl-N-octadecyl-3-aminopropyltrimethoxysilyl chloride), N-perfluorooctylsulfonyl-3-aminopropyltrimethylammonium iodide, long-chain alkyl alcohols, and silane polymers.

According to the liquid crystal composition of the invention, the addition of a specific silane coupling agent described later to a crosslinkable liquid crystal compound allows liquid crystal molecules in the liquid crystal composition to be perpendicularly oriented in a stable manner, when a liquid crystal composition of the invention is applied to the surface of, for example, a base material having a colored layer formed on a glass substrate, oriented and cured, regardless of the surface properties of the base material without use of an orientation film. In particular, even when the base material surface is subjected to cleaning treatment and the properties of the base material surface are changed, a liquid crystal composition of the invention can be directly applied to the base material surface to form a phase difference layer without the disturbance of the orientation of liquid crystal molecules contained in the composition.

Furthermore, the findings of the present inventors clarify that the addition of the perpendicular orientation assistant synergistically enhances the effect of stabilizing the homeotropic orientation properties. The specific mechanism of the synergistic effect is not always clarified. However, it is estimated that the coupling of the perpendicular orientation assistant with at least part of an amino-based silane coupling agent added to a liquid crystal composition exerts the power of controlling liquid crystal molecules to be perpendicularly oriented over not only liquid crystal molecules facing the base material interface or the air interface in the phase difference layer, but over the whole containing an intermediate part of the phase difference layer.

<Negative C Plate>

Orientation of the liquid crystal molecules horizontal to the base layer (homogeneous orientation) to immobilize the molecules makes a light axis of the liquid crystal molecules parallel to a phase difference layer as well as can lead to the formation of a so-called negative C plate having an abnormal light-ray refractive index smaller than a usual light-ray refractive index in the normal direction of the phase difference layer. In this case, as a crosslinkable nematic liquid crystal compound, suitably used is a chiral nematic liquid crystal compound with steric regularity having a chiral agent added thereto.

A chiral agent is a low molecular weight compound having an optically active site. The molecular weight of a chiral agent to be added to the liquid crystal composition of the invention is preferably 1500 or less. A chiral agent is used for the purpose of inducing a spiral pitch to positive one-axial nematic regularity exhibited by the crosslinkable liquid crystal compounds indicated in chemical formulae 1 to 4 above. Examples of the chiral agent include a compound indicated in chemical formula 5 below. In addition to these, the chiral agent is not limited to chemical formula 5 so long as it is compatible with crosslinkable liquid crystal compounds indicated in chemical formulae 1 to 4 above in a solution state or in a melt state and can induce spiral pitch without spoiling liquid crystallinity of the crosslinkable liquid crystal compound. However, a chiral agent having crosslinkable functional groups on both terminals in the molecule is preferable upon the obtainment of a good heat resistant optical element.

Examples of the chiral agents that are usable in the invention include compounds having one or two or more asymmetric carbon atoms, compounds having a hetero atom on which an asymmetric compound is present such as a chiral amine and chiral sulfoxide, and compounds having axis asymmetry such as cumulene and binaphthol. For example, commercially available chiral nematic liquid crystal compounds, more specifically S-811 available from Merck & Co., Inc. and the like are usable. Properties of a chiral agent selected lead to the destruction of nematic regularity and a decrease in orientation properties, possessed by a crosslinkable liquid crystal compound, in some cases. Additionally, the addition of non-polymerizable chiral agent to the liquid crystal compound of the invention sometimes results in a decrease in curability of a crosslinkable liquid crystal compound or a decrease in electric reliability of a phase difference layer produced by curing a crosslinkable liquid crystal compound. Moreover, use of a large amount of a chiral agent having an optical active site leads to an increase in cost. Therefore, as a chiral agent used in the invention, a chiral agent is preferably selected that has a large effect of inducing a spiral pitch to a liquid crystal polymer. Specifically, compounds as represented by general formulae (3) to (5) below that are low molecular weight compounds having axis asymmetry within the molecule are preferably used.

[Chemical formula 5]

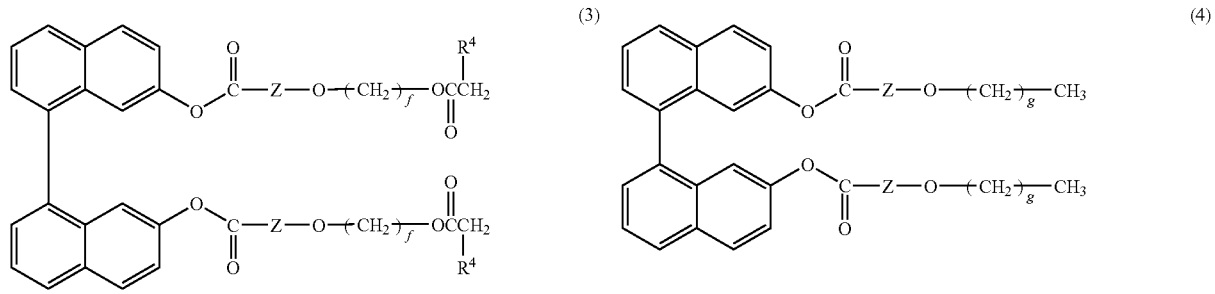

-continued (5)

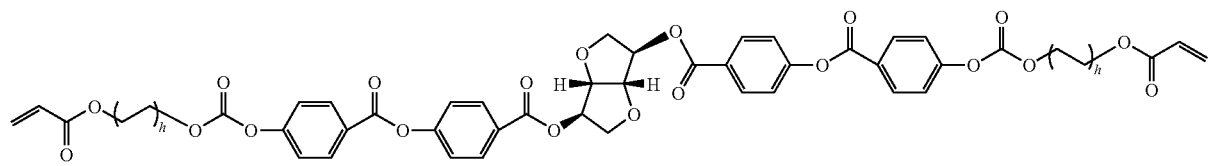

In general formula (3) above, $R^4$ represents hydrogen or a methyl group.

Additionally, Z in general formulae (3) and (4) above is any one of (i) to (xxiv) indicated in chemical formulae 6 and 7 below. Of these, any one of formulae (i), (ii), (iii), (v) and (vii) is preferred. f and g in general formulae (3) and (4) each represent the repeat number of an alkylene group. f and g may be the same or different, each being more preferable in the range of from 2 to 12. The compound of general formula (3) with f of 0 or 1 and the compound of general formula (4) with g of 0 or 1 are not preferable because of lack in stability and susceptibleness to hydrolysis and also high crystallinity. On the other hand, the compound of general formula (3) with f of 13 or more and the compound of general formula (4) with g of 13 or more are not preferable because of low melting points. In other words, the use of a chiral agent with f and g being each from 2 to 12 leads to the advantage of obtaining sufficient compatibility with the crosslinkable liquid crystal compounds illustrated in chemical formulae 1 to 4 above.

h in general formula (5) is preferably an integer of from 2 to 5. Additionally, Z in formulae (i) and (ii) indicated in chemical formula 6 below is any of hydrogen, chlorine, bromine, iodine, an alkyl group having 1 to 4 carbon atoms, a methoxy group, a cyano group and a nitro group.

[Chemical formula 6]

(i)
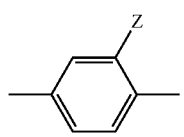

(ii)
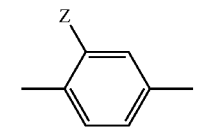

(iii)
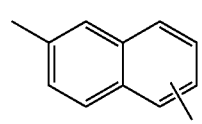

(iv)
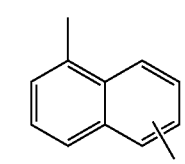

(v)
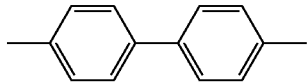

[Chemical formula 7]

(vi)
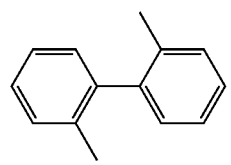

(vii)

(viii)
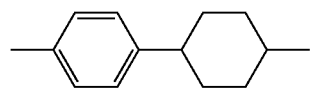

(ix)
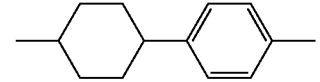

(x)
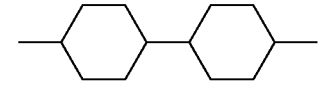

(xi)
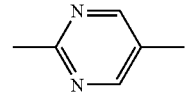

(xii)
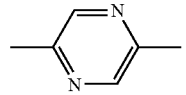

(xiii)
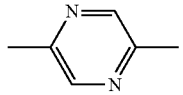

(xiv)
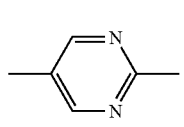

(xv)
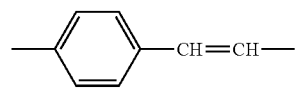

(xvi)
—CH=CH—⏤⏤

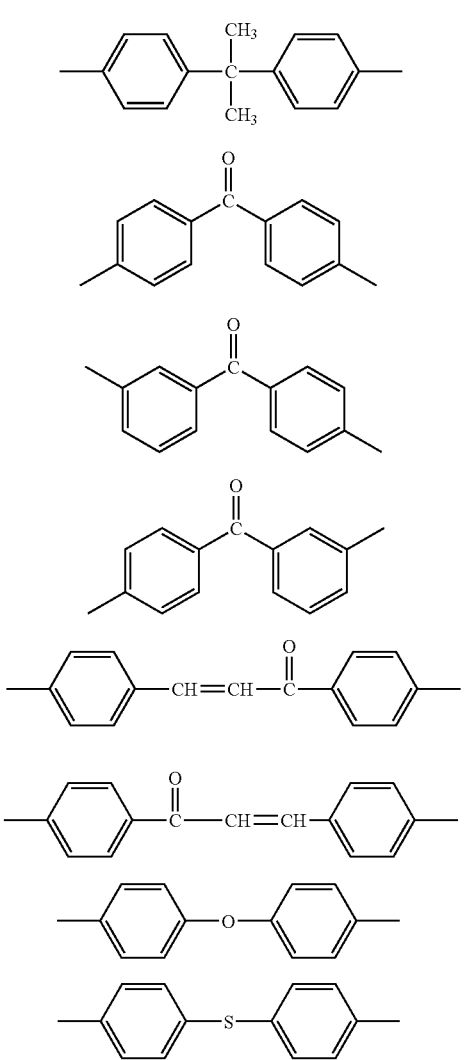

The optimal range of the amount of blending of a chiral agent is determined as appropriate in consideration of a spiral pitch to induce liquid crystal molecules constituting a crosslinkable liquid crystal compound, the extent of cholesteric regularity of liquid crystal molecules contained in a phase difference layer to be finally obtained, and the like, and largely varies depending on the kind of liquid crystal molecule or the like. Specifically, the chiral agent is generally blended so as to be from 0.01 to 30% by weight, preferably from 0.1 to 20% by weight, more preferably from 0.5 to 15% by weight, and particularly preferably from 1 to 15% by weight, in a value relative to blend conversion. When the content of a chiral agent in a blend component is less than 0.01% by weight, the chiral agent cannot impart sufficient cholesteric regularity to liquid crystal molecules contained in a liquid crystal composition in some cases. When the content of a chiral agent exceeds 30% by weight, the orientation performance of liquid crystal molecules in a liquid crystal composition is hindered, As a result, problems are caused that increase the curing rate and crosslinking density in some cases when the liquid crystal molecules are crosslinked to each other to cure the liquid crystal composition. When the amount of blending of a chiral agent is within the above appropriate numerical value range, optical properties good in a phase difference layer can be obtained because the orientation of a negative C plate and crosslinking curability are enhanced.

The chiral agent used in the invention does not necessarily particularly have crosslinking properties. However, when thermal stability and the like of a phase difference layer to be obtained are taken into account, a crosslinkable chiral agent is preferably used that polymerizes with the crosslinkable liquid crystal compound and is capable of immobilizing cholesteric regularity. In particular, the presence of crosslinkable functional groups on both terminals of the molecule is preferred upon obtainment of an optical element good in heat resistance.

<Positive A Plate>

The horizontal orientation of liquid crystal molecules to the base layer (homogeneous orientation) to immobilize the molecules without use of the chiral agent can make the light axis of the liquid crystal molecules and phase difference layer parallel and form a so-called positive A plate having an abnormal light-ray refractive index larger than the usual light-ray refractive index in the inside face direction of the phase difference layer. In this case, the liquid crystal molecules can be horizontally oriented by loading to liquid crystal molecules, an orientation regulation force arising from a horizontal orientation film subjected to rubbing treatment or the like, or by adding a leveling agent for restraining the surface free energy relative to the air interface to a liquid crystal composition.

<Silane Coupling Agent>

A silane coupling agent is blended to a liquid crystal composition of the invention. As the silane coupling agent used is a mixture of at least one kind or two or more kinds of any of silane coupling agents having a sulfide group as a functional group in its molecular structure (i.e., sulfide silane coupling agent), silane coupling agents having a mercapto group (i.e., mercapto silane coupling agents), silane coupling agents having an amino group (i.e., amino silane coupling agents), and silane coupling agents having a (meth) acryloyl group (i.e., (meth) acryloyl silane coupling agents). Blending of the above silane coupling agent having the specific functional group with the liquid crystal composition of the invention, together with a multifunctional compound having an alcoholic hydroxyl group described later, has the effects of improving the hardness and adhesion properties to the base material, of a phase difference layer.

Moreover, in the invention, blending of the above silane coupling agent can also have the effect of improvement in the perpendicular orientation properties of a crosslinkable liquid crystal compound.

Examples of the specific sulfide silane coupling agent used in the invention include bis[3-(triethoxysilyl) propyl]tetrasulfide (KBE-846 available from Shin-Etsu Chemical Co., Ltd.), bis[3-(triethoxysilyl)propyl]disulfide (SIB1824.6 available from Gelest, Inc.), and bis[m-(2-triethoxysilylethyl)tolyl] polysulfide (SIB1820.5 available from Gelest, Inc.).

Specific examples of the specific mercapto silane coupling agent used in the invention include 3-mercaptopropylmethyl dimethoxysilane (KBM-802 available from Shin-Etsu Chemical Co., Ltd.), 3-mercaptopropyltrimethoxysilane (KBM-803 available from Shin-Etsu Chemical Co., Ltd., and TSL8380 available from Toshiba Silicone Co., Ltd.), 3-mercaptopropyltriethoxysilane (SIM6475.0 available from Gelest, Inc.), 11-mercaptoundecyltrimethoxysilane (SIM6480.0 available from Gelest, Inc.), mercaptomethylmethyldiethoxysilane (SIM6473.0 available from Gelest, Inc.), and S-(octanoyl)mercaptopropyltriethoxysilane (SIM6704.0 available from Gelest, Inc.).

Specific examples of the amino silane coupling agent used in the invention also include, in addition to so-called compounds classified into primary amines and secondary amines and tertiary amines, "compounds having a structure in which an amino group is reversibly masked within the molecule". Herein, the "compounds having a structure in which an amino group is reversibly masked within the molecule" may include ketimine silane coupling agents. In addition, the "structure in which an amino group is reversibly masked within the molecule" may specifically include a ketimine structure. The above ketimine structure includes a structure formed by reacting a ketone group in a compound having the ketone group with an amino group in a compound having a primary amino group.

Specific examples of the amino silane coupling agent used in the invention include N-2-(aminoethyl)-3-aminopropylmethyl dimethoxysilane (KBM-602 available from Shin-Etsu Chemical Co., Ltd., and TSL8345 available from Toshiba Silicone Co., Ltd.), N-2-(aminoethyl)-3-aminopropyltrimethoxysilane (KBM-603 available from Shin-Etsu Chemical Co., Ltd., and TSL8340 available from Toshiba Silicone Co., Ltd.), N2-(aminoethyl)-3-aminopropyltriethoxysilane (KBE-603 available from Shin-Etsu Chemical Co., Ltd., and TSL8331 available from Toshiba Silicone Co., Ltd.), 3-aminopropyltrimethoxysilane (KBM-903 available from Shin-Etsu Chemical Co., Ltd.), 3-aminopropyltriethoxysilane (KBE-903 available from Shin-Etsu Chemical Co., Ltd.), 3-triethoxysilyl-N-(1,3-dimethyl-butylidene)propylamine (KBE-9103 available from Shin-Etsu Chemical Co., Ltd.), and N-phenyl-3-aminopropyltrimethoxysilane (KBM573 available from Shin-Etsu Chemical Co., Ltd.).

However, when a phase difference layer using the liquid crystal composition of the invention is formed, the ketimine silane coupling agent of the plurality of amino silane coupling agents are suitably used, from the viewpoint of forming a phase difference layer extremely excellent in transparency.

Specific examples of the ketimine-based silane coupling agent include, not only 3-triethoxysilyl-N-(1,3-dimethyl-butylidene)propylamine (KBE-9103 available from Shin-Etsu Chemical Co., Ltd.), but also 3-trimethoxysilyl-N-(diethylmethylidene)propylamine, 3-trimethoxysilyl-N-(1-ethyl-propylidene)propylamine, 3-trimethoxysilyl-N-(1-ethyl-pentylidene)propylamine, 3-trimethoxysilyl-N-(1-methyl-butylidene)propylamine, 3-trimethoxysilyl-N-(1,3-dimethyl-butylidene)propylamine, 3-trimethoxysilyl-N-(2,2'-dimethyl-pentylidene)propylamine, 3-trimethoxysilyl-N-(1,2-methyl-propylidene)propylamine, 3-trimethoxysilyl-N-(dipropyl-methylidene)propylamine, 3-trimethoxysilyl-N-(cyclopentylidene)propylamine, 3-trimethoxysilyl-N-(cyclohexylidene)propylamine, 3-trimethoxysilyl-N-(2-methylcyclohexylidene)propylamine, 3-trimethoxysilyl-N-(4-methylcyclohexylidene)propylamine, 3-trimethoxysilyl-N-(benzylidene)propylamine, 3-trimethoxysilyl-N-(hexylidene)propylamine, 3-trimethoxysilyl-N-(heptylidene)propylamine, 6-trimethoxysilyl-N-(1,3-dimethyl-butylidene)hexylamine, 10-trimethoxysilyl-N-(1,3-methyl-butylidene)decylamine, 10-trimethoxysilyl-N-(1,3-dimethyl-butylidene)decylamine, trimethoxysilyl-N-(1,3-methyl-butylidene)methylamine, (trimethoxysilyl)ethyl-N-(1,3-methyl-butylidene)benzylamine, 3-triethoxysilyl-N-(1-methyl-propylidene)propylamine, 3-triethoxysilyl-N-(1-methyl-butylidene)propylamine, 3-triethoxysilyl-N-(1,3-dimethyl-butylidene)propylamine, 3-triethoxysilyl-N-(1-dimethyl-pentylidene)propylamine and 3-methyldimethoxysilyl-N-(1,3-dimethyl-butylidene)propylamine.

Specific examples of the (meth)acryloyl silane coupling agent used in the invention include 3-methacryloxypropylmethyl dimethoxysilane (KBM-502 available from Shin-Etsu Chemical Co., Ltd., and TSL8375 available from Toshiba Silicone Co., Ltd.), 3-methacryloxypropyltrimethoxysilane (KBM-503 available from Shin-Etsu Chemical Co., Ltd., and TSL8370 available from Toshiba Silicone Co., Ltd.), 3-methacryloxypropylmethyl dimethoxysilane (KBE-502 available from Shin-Etsu Chemical Co., Ltd.), 3-methacryloxypropyltriethoxysilane (KBE-503 available from Shin-Etsu Chemical Co., Ltd.), 3-acryloxypropyltrimethoxysilane (KBM-5103 available from Shin-Etsu Chemical Co., Ltd.), (3-acryloxypropyl)trimethoxysilane (SIA0200.0 available from Gelest, Inc.), methacryloxymethyltriethoxysilane (6482.0 available from Gelest, Inc.), andmethacryloxymethyltrimethoxysilane (6483.0 available from Gelest, Inc.).

The above silane coupling agents can also be used in combination of two or more different kinds thereof. Specifically, of sulfide, mercapto, amino, or (meth)acryloyl silane coupling agent, two or more kinds of the same base silane coupling agents may be selected and combined for use. Alternatively, one kind or two or more kinds of the different base silane coupling agents may be selected and combined for use.

The amount of blending of a silane coupling agent is from 0.01 to 20% by weight, preferably from 0.01 to 5% by weight, more preferably from 0.01 to 2% by weight, and still more preferably from 0.1 to 2% by weight in a value relative to blend conversion of the liquid crystal composition. Addition of 0.01% by weight or more enables to obtain good perpendicular orientation properties of liquid crystal molecules and substrate adhesion properties sufficient in a phase difference layer. Additionally, making the amount 20% by weight or less can well restrain the generation of orientation failure of a liquid crystal in a phase difference layer and a decrease in electric reliability of a phase difference layer.

The ratio of blending of a crosslinkable liquid crystal compound to a silane coupling agent used in the liquid crystal composition of the invention is preferably 100:0.01 to 5.5, more preferably 100:0.01 to 1.1, and particularly preferably 100:0.01 to 0.5.

<Multifunctional Compound>

A multifunctional compound used for the liquid crystal composition of the invention is a molecule containing two or more polymerizable functional groups in the molecular structure. As the multifunctional compound, preferably used is a compound having an alcoholic hydroxyl group in the molecular structure. The number of alcoholic hydroxyl groups contained in the multifunctional compound is preferably from 1 to 3, more preferably from 1 to 2 due to effectively making the turbulence of the orientation properties of liquid crystal molecules difficult.

The polymerizable functional groups in a multifunctional compound may include (meth)acrylate groups, epoxy groups or oxetane groups. Because of the advantage of high reactivity, a multifunctional (meth)acrylate containing (meth)acrylate as a polymerizable functional group is preferred.

Examples of the multifunctional (meth)acrylates having an alcoholic hydroxyl group include a monomer, oligomer, and polymer having at least one alcoholic hydroxyl group in one molecule. Such an alcoholic multifunctional (meth)acrylate, usable is one compound or a mixture of two or more kinds of the compounds indicated in chemical formula 8 below.

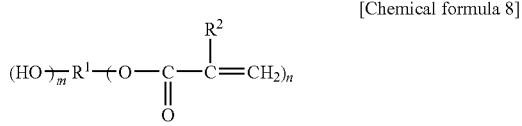

[Chemical formula 8]

In the general formula indicated in chemical formula 8, m represents an integer of from 1 to 3, and n represents an integer of 2 or more. In the formula, $R^1$ indicates an organic hydrocarbon structure having 1 or more hydrocarbon atoms and $R^2$ each indicates hydrogen or a methyl group.

Examples of the compound indicated in chemical formula 8 include 2-hydroxy-1-3-dimethacryloxypropane, 2-hydroxy-1-acryloxy-3-methacryloxypropane, ethylenebis[oxy(2-hydroxypropane-1,3-diyl)]dimethacrylate, (1-methyl-1,2-ethanediyl)bis[oxy(2-hydroxy-3,1-propanediyl)]diacrylate, bisphenol-A-glycidyl methacrylate, bisphenol-A-glycidyl acrylate, pentaerythritoldiacrylate monostearate, pentaerythritol triacrylate, and dipentaerythritol hydroxy pentaacrylate.

Moreover, the molecular weight of a multifunctional compound blended in the liquid crystal composition of the invention is not particularly limited; however, from the viewpoint of its compatibility with a crosslinkable liquid crystal compound, the molecular weight is preferably 1000 or less.

The multifunctional compound needs to be added within the range of largely impairing the orientation of liquid crystals and the amount of addition is from 5.0 to 20% by weight, preferably from 10 to 15% by weight in a value relative to blend conversion of the liquid crystal composition. Making the amount of addition 5.0% by weight or more can sufficiently improve the hardness of a phase difference layer, and making the amount 20% by weight or less restrains the generation of disturbance when a crosslinkable liquid crystal is oriented.

<Epoxy Compound>

An alicyclic epoxy compound having an epoxy group within an alicyclic alkyl group can be particularly preferably used as an epoxy compound blended in a liquid crystal composition of the invention. According to the findings of the present invention, it has been found that the addition of an alicyclic epoxy compound instead of a chain epoxy compound can further suitably improve adhesion properties of a phase difference layer produced by polymerization curing a liquid crystal composition with the base material.

In the liquid crystal composition of the invention, a composition having two or more epoxy groups in the molecular structure has the effect of particularly suitably improving the adhesion properties to the base material. Thus, the use of such an epoxy-based compound renders the liquid crystal composition of the invention both having good perpendicular orientation properties and a high hardness during polymerization curing to be further useful.

An epoxy compound used in the invention is preferably contained in a liquid crystal composition as a low molecular weight compound (monomer, oligomer). Use of an epoxy-based polymer compound having an average polymerization degree of 10 or more cannot obtain its sufficient compatibility with a crosslinkable liquid crystal compound, and the polymer sometimes becomes the factor of inhibiting orientation properties of liquid crystal molecules. On the contrary, when a low molecular weight compound of epoxy compounds is used, such a matter does not occur.

Moreover, use of a low molecular weight compound of epoxy compounds in the present invention is preferred as compared with the use of a polymer since the effect of improving adhesion properties of a phase difference layer to the base material is enhanced for the unit amount of blending of an epoxy compound.

Thus, a low molecular weight compound of epoxy compounds used in the invention has preferably an average polymerization degree of 1 or more and less than 10, particularly preferably an average polymerization degree of 1, i.e., a monomer is preferred.

When the low molecular weight compound of epoxy compounds suitably used in the invention is stipulated in terms of the number average molecular weight, it is preferably 1000 or less, more preferably 800 or less.

Specific examples of the specific low molecular weight compound include alicyclic epoxy compounds such as 3,4-epoxycyclohexenylmethyl-3',4'-epoxycyclohexenecarboxylate (Seroxide 2021 available from Daicel Chemical Industries, Ltd.), epoxidized 3-cyclohehene-1,2-carboxylate-bis(3-cyclohexenylmethyl)-modifie d-ϵ-caprolactone (Epo-Lead GT301 available from Daicel Chemical Industries, Ltd.), epoxidized butanetetracaroxylatetetrakis-(3-cyclohexenylmethyl)-modified-ϵ-caprolactone (Epo-Lead GT401 available from Daicel Chemical Industries, Ltd.), alicyclic diepoxyacetal, alicyclic diepoxyadipate and vinylcyclohexenedioxide. The alicyclic epoxy compounds can also be used in combination of 2 or more different kinds thereof.

The amount of blending of an epoxy compound is from 1 to 20% by weight, preferably from 5 to 10% by weight, in a value relative to blend conversion in the liquid crystal composition. The addition of 1% by weight or more can impart significant substrate adhesion properties to a phase difference layer obtained by polymerization curing a crosslinkable liquid crystal compound. Moreover, addition of 5% by weight or more can provide sufficient adhesion properties to the base material over the peeling strength between other laminates.

Other blend components arbitrarily added to the liquid crystal composition of the invention will be described hereinafter.

<Photopolymerization Initiator>

A crosslinkable liquid crystal compound contained in a liquid crystal composition is photopolymerizable, and when the compound is polymerization-cured by irradiation with active radiation rays such as ultraviolet rays, a photopolymerization initiator may be blended in the liquid crystal composition. A photopolymerization initiator serves as an initiator for crosslinking polymerization of liquid crystal molecules when the liquid crystal composition of the invention is applied onto a base layer such as a base material to form a liquid crystal coating film, liquid crystal molecules contained in the liquid crystal coating film are oriented in a predetermined direction, and then the liquid crystal coating film is irradiated with active radiation rays to start crosslinking polymerization of the liquid crystal molecules with each other to thereby form a phase difference layer.

A radical polymerization initiator can be used as the photopolymerization initiator. The radical polymerization initiator is a compound that generates a free radical by ultraviolet-ray energy. Examples of the radical polymerization initiator include benzophenone derivatives such as benzoin and benzophenone and derivatives such as their esters; xanthone and thioxanthone derivatives; halogen-bearing compounds such as chlorosulfonyl, chloromethyl polynuclear aromatic compounds, chloromethyl heterocyclic compounds and chloromethylbenzophenones; triazines; fluorenones; haloalkanes;

redox couples of a photoreducing dye and a reducing agent; organic sulfur compounds; and peroxides.

More specifically, preferable examples of the photopolymerization initiator include ketones and biimidazole-based compounds such as Irgacure 184, Irgacure 369, Irgacure 651 and Irgacure 907 (available from Ciba Specialty Chemicals Co., Ltd.), Darocure (available from Melc Corp.), Adeka 1717 (available from Adeka Corp.) and 2,2'-bis(o-chlorophenyl)-4,5,4'-tetraphenyl-1,2'-biimidazole (available from Kurokane Kasei Co., Ltd.). These photopolymerization initiators can be used in combination of one or two or more products. When two or more products are used in combination, photopolymerization initiators different in absorption wavelength are preferably used in combination so as not to inhibit mutual absorption spectral characteristics.

A photopolymerization initiator needs to be added in the range of largely hampering the orientation of a crosslinkable liquid crystal compound. Specifically, a photopolymerization initiator may be added so as to be from 0.01 to 15% by weight, preferably from 0.1 to 12% by weight, more preferably from 0.1 to 10% by weight, and particularly preferably from 0.5 to 10% by weight, in a value relative to blend conversion in relation to the liquid crystal composition. In addition to a photopolymerization initiator, a polymerization inhibitor, a thickener and/or a surfactant can be added as well in the range of impairing the object of the present invention.

Available examples of the polymerization inhibitor include p-benzoquinone, hydroquinone, p-t-butylcatechol, di-t-butyl-paracresol, 2,4,6-tri-t-butylphenol, hydroxyquinone methyl ether, α-naphthol, and acetoanidine acetate.

The content of the crosslinkable liquid crystal compound, sulfide, mercapto, amino or (meth)acryloyl silane coupling agent, alcoholic multifunctional compound, epoxy compound and photopolymerization initiator, within the numerical value range of indicating the above preferred content, can be adjusted as appropriate depending on a specific compound selected from each of them or the kind of solvents described later. For example, for the amount of each blend contained in a liquid crystal composition, (a) the amount of a crosslinkable liquid crystal compound containing a (meth)acryloyl group may be from 70 to 93.89% by weight, (b) the amount of the above silane coupling agent may be from 0.01 to 20% by weight, (c) the amount of an alcoholic multifunctional (meth) acrylate may be from 5 to 20% by weight, (d) the amount of an epoxy compound may be from 1 to 20% by weight and (e) the amount of a photopolymerization initiator may be from 0.1 to 10% by weight, in a value relative to blend conversion, with the total amount of (b) to (e) above being 30% by weight or less.

<Solvents>

The liquid crystal composition of the invention may be used as a solution prepared by dissolution of the above blend component in a solvent for the improvement of application properties to the base layer. The solvent is not particularly limited so long as it can dissolve blend components such as the crosslinkable liquid crystal compound and silane coupling agent as described above and does not inhibit the performance of a material to be coated.

Specific examples of the solvent include hydrocarbons such as benzene, toluene, xylene, n-butylbenzene, diethylbenzene and tetralin; ethers such as methoxybenzene, 1,2-dimethoxybenzene and diethylene glycol dimethyl ether; ketones such as acetone, methylethylketone, methylisobutylketone, cyclohexanone and 2,4-pentanedione; esters such as ethyl acetate, ethylene glycol monomethyl ether acetate, propylene glycohol monomethyl ether acetate, propylene glycol monoethyl ether acetate and γ-butyrolactone; amide solvents such as 2-pyrolidone, N-methyl-2-pyrolidone, dimethylformamide and dimethylacetamide; halogen solvents such as chloroform, dichloromethane, carbon tetrachloride, dichloroethane, tetrachloroethane, trichloroethylene, tetrachloroethylene, chlorobenzene and orthodichlorobenzene; alcohols such as t-butyl alcohol, diacetone alcohol, glycerin, monoacetin, ethylene glycol, triethyleneglycol, hexylene glycol, ethylene glycol monomethyl ether, ethylcellosolve and butylcellosolve; and phenols such as phenol and parachlorophenol.

In the case where use of a single solvent only is insufficient in dissolution of blend components such as a crosslinkable liquid crystal compound or may erode a material onto which a liquid crystal composition solution is to be applied, or the like, the use of a mixture of two or more solvents can avoid the disadvantages. In the solvents illustrated above, the solvents that are suitably used alone include hydrocarbon solvents and glycol monoether acetate solvents. Similarly, the solvents that are suitably used in a mixture of two kinds or more include combinations of ethers or ketones and glycols.

The concentration of blend components in a liquid crystal composition solution varies depending on solubility of blend components contained in a liquid crystal composition or a desired thickness of a phase difference layer, and is usually from 1 to 60% by weight, particularly preferably from 3 to 40% by weight. The above concentration can be obtained by dividing the weight obtained by subtracting the weight of a solvent from the weight of a liquid crystal composition solution by the total weight of the liquid crystal composition solution and then multiplying by 100.

<Color Filter Using Liquid Crystal Composition>

The liquid crystal composition of the invention can be used for the formation of a phase difference layer for adjusting a view angle in a liquid crystal display apparatus. A phase difference layer can be arranged, for example, in an optical element represented by the color filter of a liquid crystal display apparatus. Hereinafter, a color filter of the present invention provided with the phase difference layer will be illustratively described with reference to the drawings.

FIG. 1 indicates one example of a color filter 1 according to the invention. In FIG. 1, reference numeral 2 indicates a transparent substrate, reference numeral 3 indicates a colored filter and reference numeral 4 indicates a phase difference layer fabricated from the liquid crystal composition of the invention. The color filter 1 is formed by arranging a black matrix 5 (BM), a subpixel 6 of red (R), a subpixel 7 of green (G) and a subpixel 8 of blue (B) on the transparent substrate 2 to form the colored layer 3 and further laminating the phase difference layer 4 formed by use of the liquid crystal composition of the invention on the surface of the colored layer 3.

The transparent substrate 2 preferably uses a substrate that exhibits light transmission and is optically isotropic. However, the transparent substrate 2 can also use a substrate having as appropriate locally arranged thereon a region of light shielding properties or optical anisotropy. In addition, the light transmittance of the transparent substrate 2 can be selected as appropriate depending on applications of the color filter.

Specifically, in addition to glass, silicon, or inorganic substrates such as quartz, organic substrates listed below can be used as the transparent substrate 2. Examples of the organic substrate include substrates made of acryl such as polymethylmethacrylate, polyamide, polyacetal, polybutylene terephthalate, polyethylene terephthalate, polyethylene naphthalate, triacetyl cellulose, syndiotactic polystyrene or the like, polyphenylene sulfide, polyether ketone, polyether ether ketone, fluorine resin, polyethernitrile or the like, polycarbonate, modified polyphenylene ether, polycyclohexene, polynorbornane-based resin or the like, polysulfone, polyether sulfone, polypropylene, polyarylate, polyamide imide, polyether imide, polyether ketone, or thermoplastic polyimide. A substrate made of more general plastics is also usable as the transparent substrate 2.

Of these, in the case where the color filter of the present invention is used for a liquid crystal display apparatus, alkali-free glass containing no alkaline components in the glass is preferably used as the transparent substrate 2. The thickness of the transparent substrate 2 is determined as appropriate depending on applications of the color filter and, for example a transparent substrate having a thickness of roughly from 5 µm to 3 mm is used.

On the transparent substrate 2, the black matrix (BM) 5 with light shielding or light absorption properties may be formed in advance in a stripe fashion or in a mosaic fashion or the like, for the partition of predetermined configuration positions of subpixels of the three colors R, G and B.

A colored resist having each color of R, G and B is applied onto such transparent substrate 2 by means of a photolithographic method or ink jet method, and the resulting substrate is further heat baked to arrange the subpixel 6 of red (R), the subpixel 7 of green (G) and the subpixel 8 of blue (B) in this order, thereby forming the colored layer 3. A colored resist can be obtained by dispersing a coloring material of each color such as a pigment in a solvent.

The colored layer 3 is generally subjected to surface modification treatment such as UV cleaning treatment or corona treatment in order to remove impurities of the surface and improve the wettability to a liquid crystal composition. The implementation of such treatment, when a liquid crystal composition is applied onto the surface of the colored layer 3 in a post-process, can improve the wettability of liquid crystal molecules contained in the composition.

When UV cleaning treatment is carried out, the amount of irradiation of ultraviolet rays is from 500 mJ/cm$^2$ to 3000 mJ/cm$^2$, more preferably from 900 mJ/cm$^2$ to 3000 mJ/cm$^2$.

When such a surface modification treatment is performed, however, the properties of the surface of the colored layer 3 are largely changed, although the wettability of the surface of the colored layer is preferably improved. As a result, use of the conventional liquid crystal composition poses the following problem. That is, the conventional liquid crystal composition is directly applied onto the surface of a colored layer cleaned with an amount of irradiation of an ultraviolet ray of 900 mJ/cm$^2$ or more without arranging a perpendicular orientation film to form a liquid crystal coating film and liquid crystal molecules contained therein are made to be perpendicularly oriented. In this case, the orientation of the liquid crystal molecules is disturbed to be incapable of obtaining a phase difference layer well homeotropically oriented. On the contrary, the liquid crystal composition of the invention, albeit the surface of a colored layer cleaned with an amount of irradiation of an ultraviolet ray of 900 mJ/cm$^2$ or more, makes it possible to well perpendicularly orient the liquid crystal molecules in the liquid crystal composition, without the presence of a perpendicular orientation film. This can provide, according to the liquid crystal composition of the invention, a phase difference layer in which liquid crystal molecules stably perpendicularly orient, i.e., a high-quality positive C plate.

The liquid crystal composition of the invention is applied onto the surface of the colored layer 3 to form a liquid crystal coating film. The methods of applying a liquid crystal composition that can be used as appropriate include a variety of printing methods such as a gravure printing method, an off-set printing method, a relief printing method, a screen printing method, a transfer printing method, an electrostatic printing method and an on-demand printing method, a gravure coat method, a roll coat method, a knife coat method, an air knife coat method, a bar coat method, a dip coat method, a kiss coat method, a spray coat method, a die coat method, a comma coat method, an ink jet method, a spin coat method, and a slit coat method. After the liquid crystal coating film is formed on the colored layer, the solvent is vaporized by atmospheric pressure drying, reduced-pressure drying or the like and also orientation properties are imparted to liquid crystal molecules contained in the liquid crystal coating film.

For example, when a liquid crystal coating film is made to be the phase difference layer 4 having a function as a positive C plate, liquid crystal molecules are crosslinked with each other in a state in which liquid crystal molecules in the liquid crystal coating film are perpendicularly oriented. Impartment of perpendicular orientation to liquid crystal molecules is that a liquid crystal coating film is heated by use of means for heating with an infrared ray, and the temperature of the liquid crystal coating film is made to be not lower than a temperature (liquid crystal phase transfer temperature) at which a crosslinkable liquid crystal contained therein becomes a liquid crystal phase and lower than a temperature (isotropic phase transfer temperature) at which the crosslinkable liquid crystal becomes an isotropic phase.

In particular, according to the findings of the present inventors, it has been clarified that the blending of a sulfide, mercapto, amino or (meth)acryloyl silane coupling agent can improve the perpendicular orientation properties. Because of this, even when particularly the surface of the colored layer 3 is subjected to UV cleaning treatment or surface modification treatment with an amount of irradiation of an ultraviolet ray of 900 mJ/cm$^2$ as described above, the liquid crystal molecules contained in the liquid crystal composition directly coated thereon can be provided with sufficient perpendicular orientation properties. In other words, according to the liquid crystal composition, a high cleanliness degree and substrate adhesion properties of the colored layer 3 by UV cleaning treatment or surface modification treatment can be made to be compatible with the function of a positive C plate having high optical properties by good orientation properties of liquid crystal molecules. Furthermore, it is possible to provide the color filter 1 provided with such a positive C plate inside a liquid crystal cell, i.e., the color filter 1 of an incell type.

The crosslinking polymerization of liquid crystal molecules with each other in which orientation is imparted within a liquid crystal coating film can be made to proceed by irradiating the liquid crystal coating film with an active radiation ray of a photosensitive wavelength of a liquid crystal molecule, photopolymerization initiator, or the like contained in a liquid crystal composition. At this time, the wavelength of an active radiation ray with which the liquid crystal coating film is irradiated is selected as appropriate depending on the absorption wavelength of the liquid crystal composition. For an active radiation ray radiated by the invention may be used an ultraviolet ray of a wavelength of from 200 to 500 nm. A high pressure mercury lamp, a xenon lamp, a metal halide lamp or the like is used as the ultraviolet-ray source. Although the amount of light irradiation varies also depending on the kind and composition of a crosslinkable liquid crystal compound, the kind and amount of a photopolymerization initiator, and the like, the amount may be in the order of 10 to 3000 mJ/cm$^2$, for example. The active radiation ray with which a liquid crystal coating film is irradiated is not limited to monochromic light and light is also acceptable that has a certain wavelength region containing the photosensitive wavelength of the liquid crystal composition.

In this manner, when the liquid crystal molecules contained in the liquid crystal coating film are polymerized, the liquid crystal coating film forms the phase difference layer 4 to produce the color filter 1.

Moreover, the thickness of the phase difference layer 4 is not particularly limited so long as a desired amount of phase difference is exhibited. In general, the thickness of the phase difference layer 4 is preferably in the order of 0.5 to 10 μm if considering productivity or the like.

Upon rendering a liquid crystal coating film to become the phase difference layer 4, the liquid crystal coating film may be irradiated with an active radiation ray to progress the crosslinking polymerization reaction of the liquid crystal molecules and then further a liquid crystal coating film may be baked. The implementation of such a baking step can further cure the phase difference layer 4 to thereby obtain the color filter 1 in which the surface of the phase difference layer 4 is hardened.

The above baking step can be carried out by placing the above substrate subjected to the crosslinking step in the phase difference layer 4 in an oven or the like heated to a certain temperature. For example, the above baking step can be carried out in an air atmosphere and at atmospheric pressure by means of a commercially available oven such as an AS One, a "hot air circulation oven KLO-60M. The baking temperature and baking time can be determined as appropriate depending on the thickness of a substrate provided with the difference layer 4 and the thickness of the phase difference layer 4 itself or the kind of crosslinkable liquid crystal compound used. In general, the above baking time is preferably 0.5 hour or more and 2.5 hours or less, and the above baking temperature is preferably 200° C. or more and 250° C. or less. When the baking time in the baking step exceeds 2.5 hours, the substrate turns yellow, thereby decreasing the transmittance of the substrate in some cases. On the other hand, when the time is less than 0.5 hour, the adhesion properties, heat resistance and degree of cure of the substrate are lowered, whereby a sufficient durability is not obtained in some cases.

As in the color filter 1 of the above embodiment, a liquid crystal composition is applied onto the transparent substrate 2 and the resulting substrate is oriented and immobilized to form the phase difference layer 4, thereby being capable of obtaining a so-called incell type phase difference layer 4. This can make the whole of the color filter 1 thinner, prevent the scattering of light due to the adhesive, and further obtain the effects of the improvement in heat resistance, restraint of moisture absorption distortion and the like because the phase difference layer 4 is protected by the transparent substrate 2, as compared with the conventional way of sticking a phase difference film formed like a sheet to the outside of a liquid crystal cell with an adhesive or the like.

<Method of Evaluating Hardness of Color Filter and Base Material Adhesion Properties>

In the color filter 1 of the invention that can improve the hardness of the phase difference layer 4, the pencil hardness of the phase difference layer 4 is preferably 2H or more in accordance with the evaluation criteria of JIS K 5600-5-4. The pencil hardness of the phase difference layer 4 is specifically measured by the following testing method.

(Pencil Hardness Testing)

In this testing method for pencil hardness, a pencil comprised of a lead like a long, slender cylinder and a wooden part surrounding the periphery of the lead is used. First, the wooden part is removed from the end of the pencil toward the longitudinal direction with a pencil sharpener to expose the lead by about 5 to 6 mm. At this time, care should be taken in such a manner that the lead of the pencil becomes a smooth cylindrical shape without its large loss due to breakage of the lead. Then, the edge of the lead of the pencil is contacted with and perpendicular to, a sand paper. The pencil is made to move back and forth relative to the sand paper while the angle is maintained at an angle of about 90° to flatten the edge of the lead. Next, a sample substrate having a phase difference layer, the hardness of which is to be measured, formed on the surface thereof is placed in a pencil hardness tester provided with the pencil the edge of which is flattened. The pencil hardness tester is set so that a load given to the sample substrate from the pencil is 0 g, when the edge of the pencil is contacted with the surface of the sample substrate at an angle of 45±1°. Thereafter, a load of 750±10 g is applied to the pencil. The edge of the pencil is placed on the sample substrate, and then the sample substrate is moved by 7 mm in a direction to which the pencil is leaned at 45±1° at a speed of from 0.5 to 1 mm/sec. After the edge of the pencil is moved on the surface of the sample substrate as mentioned above, the state of the surface site (testing site) of the sample substrate is visually inspected to check the kind of the pressure mark of the pencil. As inspection results, there are cases where a pressure mark is generated (i.e., a scratch mark is generated on the phase difference layer) and no pressure mark is generated. When a pressure mark is generated, it is classified into and defined as, (a) to (c), depending on the condition.

(a) Plastic Deformation: A permanent dent is generated in a phase difference layer on the surface of a sample substrate, but there is no aggregate breakage.

(b) Aggregate Breakage: A material constituting a phase difference layer is come off, or the generation of scratches or breakage in the phase difference layer is visually recognized.

(c) Combination of the Above: A state in which all the defects are generated at the same time.

When none of the above pressure marks are generated, the hardness degree for the pencil is upgraded and testing is repeated. When pressure marks are generated, the hardness degree for the pencil is downgraded and testing is repeated. However, in such repeating testing, the sites at which the edge of a pencil and a sample substrate are contacted are made not to overlap and to differ from each other for every test.

In this pencil hardness test, the hardness of a pencil is specified in such a way that a scratch mark having a length of at least 3 mm is generated in a testing site as any of the above pressure marks. In addition, the pencil hardness test is carried out twice. When the two results are different in one unit or more, the results are discarded and testing is carried out again. In other words, in a first pencil hardness test, when the hardness of a pencil is 2H and the length of the scratch mark is 3 mm or more. In a second pencil hardness test, when the hardness is 5H, these two testing results are discarded and testing is carried out again.

(Detachment Strength Testing)

In the color filter 1 of the invention that can improve the adhesion strength between the transparent substrate 2 and the colored layer 3, the detachment strength of the phase difference layer 4 after acceleration life test is preferably 0 or 1, i.e., 1 or less in accordance with JIS K 5600-5-6. The heating life test should be carried out using the acceleration life tester EHS-411M available from Espec at 100° C. and 100% RH for one hour.

Specific detachment test is carried out in the following. First, acceleration life test is carried out on a sample substrate with the phase difference layer 4 subjected to coating formation. Next, at a temperature of 23±2° C. and a humidity of 50±5%, the phase difference layer 4 is cut 6 times (cross cut) like orthogonal lattices at 1 mm intervals relative to each direction to provide lattice squares of a number of 5×5. Next, a tape having an adhesive strength of 10±1 N for widths of 25 mm and 25 mm is stuck to the lattice by use of about 75 mm of the tape in a lattice fashion such that the longitudinal direction of the tape is parallel to any of the sides of the lattice, and is pressed with a finger. Furthermore, the edge of the tape is pinched up and detached over 0.5 to 1 second at an angle of about 60° relative to the noncohesive face of the tape, and then the state of the lattice is evaluated as follows 6 levels.

Evaluation Criteria 0: A state in which the brim of the phase difference layer cut is completely smooth and no squares of the lattice have detachment.

Evaluation Criteria 1: A state in which small detachments are present on the phase difference layer at the cross point of the cut and the cross cut part affected is 5% or less.

Evaluation Criteria 2: A state in which the phase difference layer is detached along the brim of the phase difference layer cut and at a cross point. A state in which, in the cross cut part, the part affected is definitely more than 5%, but does not exceed 15%.

Evaluation Criteria 3: A state in which the phase difference layer is partially or entirely largely detached along the brim cut, and/or a variety of parts of squares of the lattice cross-cut are partially or wholly detached in the phase difference layer. A state in which the cross cut part affected by peeling definitely exceeds 15% and is less than 35%.

Evaluation Criteria 4: The phase difference layer is partially or entirely largely detached along the brim cut, and/or a few squares in the phase difference layer are detached partially or wholly. A state in which the cross cut part affected definitely exceeds 35% and does not exceed 65%.

Evaluation Criteria 5: A state in which the extent of detachment exceeds the above evaluation criterion 4 (including a state in which the entire face of the lattice cross-cut is detached).

<Other Layers>

As shown in FIG. 1, as necessarily, a protective layer 9 and a spacer 10 may be further arranged on the surface of the phase difference layer 4 sequentially. The protective layer 9 can be formed by applying onto the surface of the phase difference layer 4 a transparent resin paint comprised of a material such as acrylic, amide or ester polymer containing multifunctional acrylate, or a transparent resin material comprised of a material such as acrylic, amide or ester polymer containing multifunctional epoxy, and then drying and curing the layer. The protective layer 9 can be cured by, for example a method of radiating UV light or the like depending on the properties of a transparent resin material.

The spacer 10 is formed as follows. A photocurable photosensitive paint of comprised of a material such as acrylic, amide or ester polymer containing multifunctional acrylate is applied onto the phase difference layer 4, protective layer 9 or transparent substrate 2 and the resulting material is dried. Then, the paint is exposed and cured through a master pattern corresponding to a position where the spacer 10 is to be formed, followed by etching removing the uncured part and then further baking the whole to form the spacer 10.

In addition, the color filter 1 may be provided with another phase difference control layer or the like in between the transparent substrate 2 and the phase difference layer 4 or on the phase difference layer 4. Examples of the other phase difference control layers may include a positive A plate produced by orienting and immobilizing a liquid crystal material formed such that the light axis is parallel to the face of the transparent substrate 2.

On the other hand, on the opposite side of the color filter 1 opposite to the phase difference layer 4 across the transparent substrate 2, another functional layer 20 may be arranged. Illustrative examples of the functional layer 20 include a transparent conductive film forming an electric field between the driving electrodes described later, phase difference control layers such as the above positive or negative C plate or positive A plate, and polarizing plates. When one or two or more kinds of those are selected and laminated on the transparent substrate 2 and the color filter 1 of the invention is used as the liquid crystal display apparatus described later, a desired optical function is exhibited.

<Liquid Crystal Display Apparatus>

Figure 2:
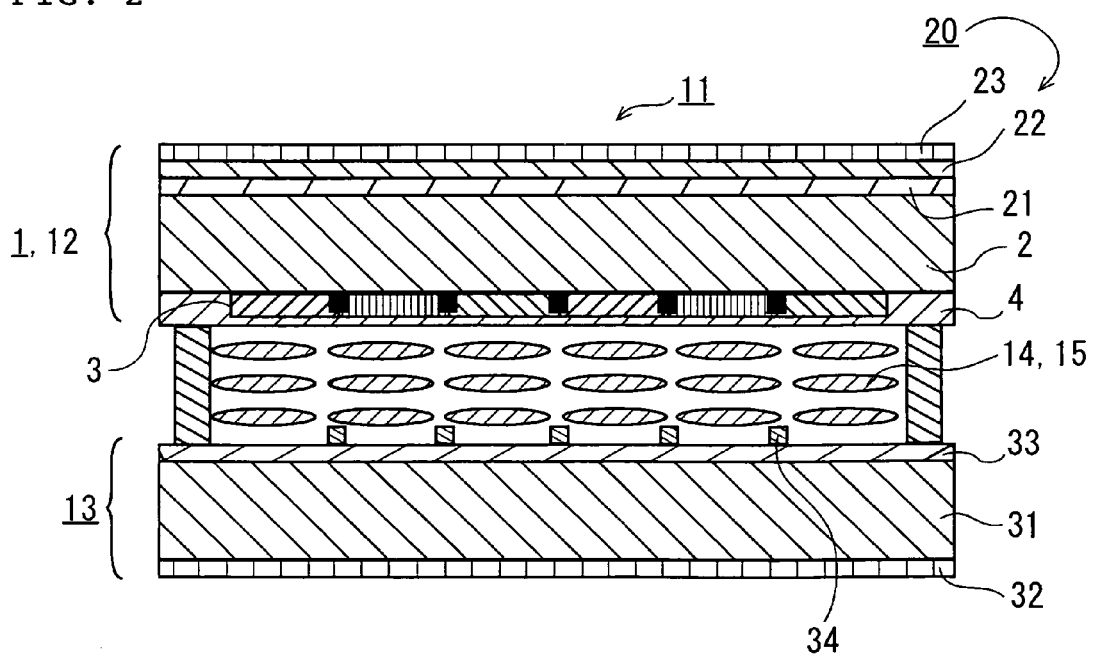
FIG. 2 is a longitudinal section indicating one example of a liquid crystal display apparatus using the color filter of the invention.

As shown in FIG. 2, the color filter 1 of the invention can be used as a display side substrate of the liquid crystal display apparatus 11. In the illustrated liquid crystal display apparatus 11, a driving liquid crystal material 14 is enclosed in between the color filter 1 and a driving circuit side substrate 13 to form a liquid crystal cell 15. This renders the color filter 1 to be used as a display side substrate 12 arranged on the observer side of the liquid crystal display apparatus 11 (corresponding to the upward direction in the figure). The phase difference layer 4 constituting the color filter 1 constructs a positive C plate in which liquid crystal molecules are immobilized in a state perpendicularly oriented to the transparent substrate 2 as described above. Herein, the phase difference layer 4 is arranged so as to be sandwiched in between the transparent substrate 2 of the color filter 1 and a transparent substrate 31 constituting the driving circuit side substrate 13 to form a so-called incell type.

When the liquid crystal display apparatus 11 is in an IPS mode, a linearly polarizing plate 23 of the display side substrate 12 and a linearly polarizing plate 32 of the driving circuit side substrate 13 are orthogonal in their transmission axes.

The driving circuit side substrate 13 is provide with a driving circuit 33 on the incell side of the transparent substrate 31 (side on which the driving liquid crystal material 14 is enclosed) and a liquid crystal driving electrode 34 the burden of the voltage of which is controlled by the driving circuit 33. On the other hand, the display side substrate 12 is provided with a transparent conductive film 21, a positive A plate 22 and the linearly polarizing plate 23 as functional layers 20 on the side of the observer of the transparent substrate 2.

EXAMPLES

Next, description will be given to a case where, for a phase difference layer using a liquid crystal composition of the invention, molecules of liquid crystal contained in the liquid crystal composition are homeotropically oriented and the phase difference layer is made to be a positive C plate, by way of example.

Example 1-1

In the following, a mixture of compounds (a) to (d) indicated in chemical formula 9 below is used as a crosslinkable liquid crystal compound to prepare composition A of the composition below. BHT as a polymerization inhibitor (2,6-di-tert-butyl-4-hydroxytoluene), Irgacure 907 as a polymerization initiator and dodecanol as another additive were blended with the composition A. The composition A was prepared in accordance with the description of Japanese Patent Application National Publication No. 2004-524385. The weight ratio of each substance in the composition A indicated below is a weight ratio of each substance based on the total weight of the composition A.

For the phase difference layer obtained, the orientation state, hardness, base material adhesion properties and transparency of the crystal molecules were each measured as follows.

<Orientation State of Liquid Crystal Molecules>

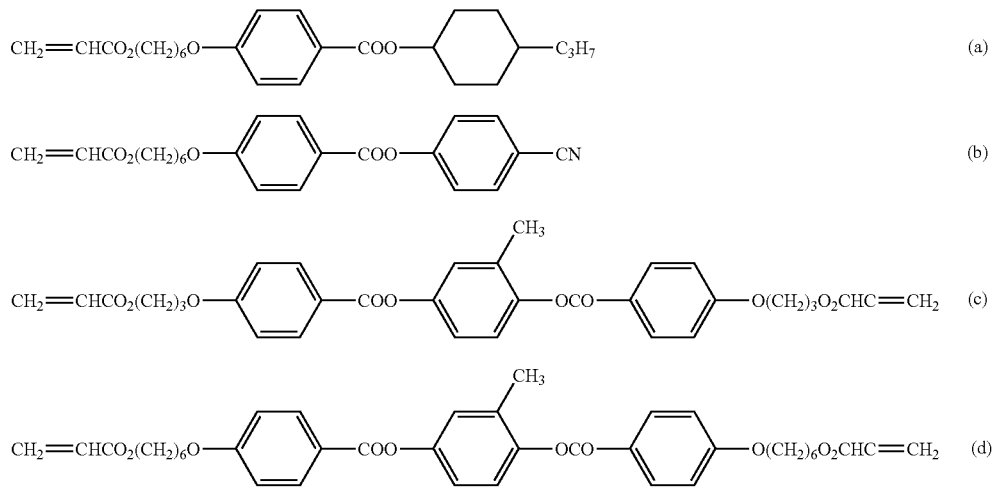

[Chemical formula 9]

Crosslinking Liquid Crystal

| Compound (a) | 32.67% by weight |
| Compound (b) | 18.67% by weight |
| Compound (c) | 21.00% by weight |
| Compound (d) | 21.00% by weight |
| Dodecanol | 1.02% by weight |
| BHY | 0.04% by weight |
| Irgacure 907 | 5.60% by weight |

To the above liquid crystal composition added were 1% by weight of bis[3-(triethoxysilyl)propyl]tetrasulfide (KBE-846 available from Shin-Etsu Chemical Co., Ltd.) as a sulfide silane coupling agent in a value relative to blend conversion, 5% by weight of pentaerythritol diacrylate monostearate (M-233 available from TOAGOSEI Co., Ltd.) as a multifunctional compound and 1% by weight of 3,4-epoxycyclohexenylmethyl-3',4'-epoxycyclohexenecarboxylate (Seroxide 2021 available from Daicel Chemical Industries, Ltd.) as an alicyclic epoxy compound. Then, the mixture was dissolved with propylene glycol monomethyl ether acetate (PGMEA) to obtain a liquid crystal composition with a concentration of 20%.

Next, a glass plate having a size of 100×100 mm and a thickness of 0.7 mm (1737 Glass, available from Corning Inc.) as a transparent substrate cleaned through suitable cleaning treatment was set to a spin coater (1H-360S, available from Mikasa Co., Ltd.). The liquid crystal composition was spin coated onto a glass substrate, and then reduced-pressure dried. Next, the resulting film was irradiated with an ultraviolet ray having a wavelength of 365 nm at 20 mW/cm$^2$ for 10 sec by means of an ultraviolet irradiation apparatus having a super high pressure mercury lamp ("trade name TOSCURE 751," available from Harison Toshiba Lighting Corp.) to crosslink the crosslinkable liquid crystal, and then was baked using an oven at 230° C. for 30 min to form a phase difference layer having a film thickness of 1.5 μm.

The orientation state of liquid crystal molecules constituting the phase difference layer was evaluated by measurement of the phase difference layer generated when light having a wavelength of 589 nm passed through the phase difference layer in the following manner. A RETS-1250AV available from Totsuka Electronics Co., Ltd. was used for the measurement of the phase difference.

Figure 3:
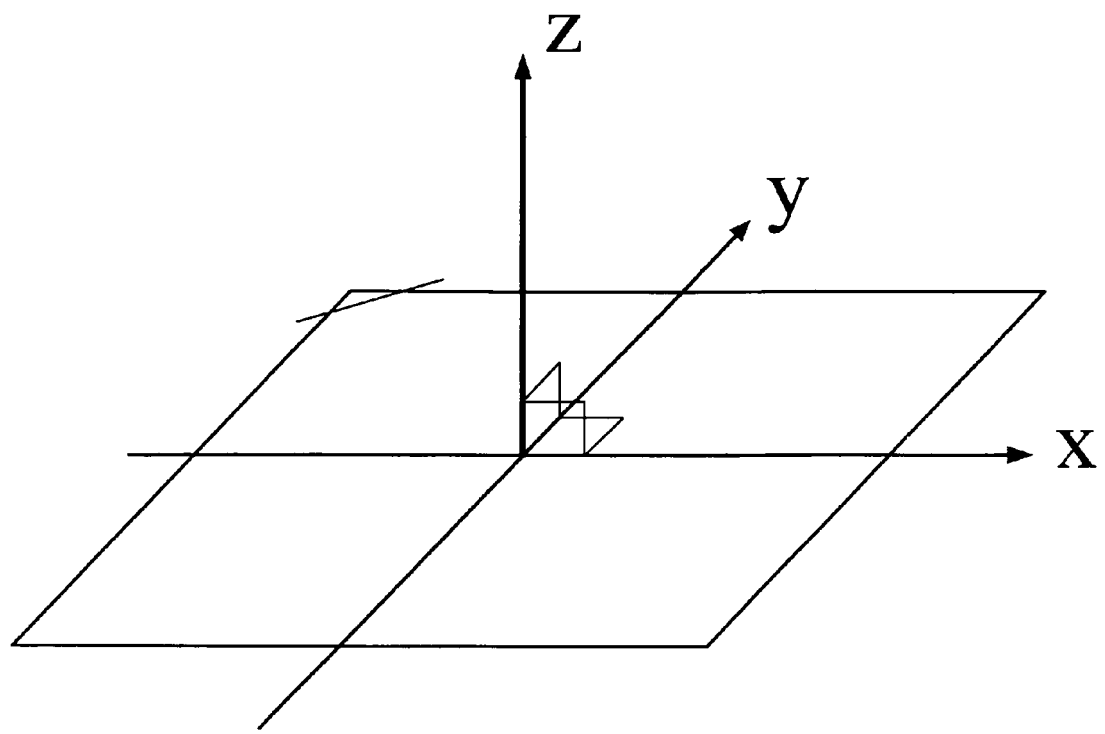
FIG. 3 is a diagram indicating a phase difference measurement direction of a sample.

As shown in FIG. 3, it was assumed that the x and y axes orthogonal to each other on the surface of a phase difference layer as well as the z axis orthogonal to the x and y axes were taken for the phase difference. In a specific wavelength, the phase difference values of a phase difference layer were measured from the direction inclined to the x axis direction relative to the z axis and the direction inclined to the y axis. In addition, whether or not the phase difference generated in an optical element was symmetrical relative to the z axis was measured for both the cases where the phase difference was measure from the direction inclined to the x axis and where it was measure from the direction inclined to they axis. Additionally, whether or not the phase difference layer is homeotropically oriented can be evaluated from the numerical value of the phase difference value when the measurement angle is 0°. On the basis of the measurement results, the quality of the orientation properties of whether or not the liquid crystal molecules are well perpendicularly oriented was evaluated as follows manner. The results are listed in Table 1.

The phase difference exhibits symmetry both in the x and y axis directions and the phase difference value in the z direction is 4 nm or less: ⊚ (Very good)

The phase difference exhibits symmetry in the x and y axis directions, or the phase difference value in the z direction is 4 nm or less: ○ (Good)

The phase difference exhibits turbulence in symmetry in the x and y axis directions, and the phase difference value in the z direction is larger than 4 nm: X (Bad)

For the criterion of the phase difference of 4 nm, when a phase difference is generated between two linearly polarizing plates placed in a crossed Nicols and it is checked whether or not visible light is made to pass through the two linearly polarizing plates, the criterion value of a phase difference within the extent to which the transmission of visible light cannot be visually identified is 4 nm.

<Hardness of Phase Difference Layer>

The hardness of a phase difference layer formed in an optical element was evaluated by the measurement of a pencil hardness in accordance with JIS K 5600-5-4. The hardness of a phase difference layer formed in the optical element obtained was evaluated as follows. The results are also indicated in Table 1.

The hardness of the pencil is equivalent to 2H or larger (The pencil hardness is 2H or larger): ⊚ (Very good)

The hardness of the pencil is smaller than 2H and equivalent to, or larger than B: ○ (Good)

The hardness of the pencil is smaller than B: X (Bad)

<Base Material Adhesion Properties of Phase Difference Layer>

For the measurement of base material adhesion properties of a phase difference layer formed in an optical element, the phase difference layer was subjected to acceleration life test for one hour at a temperature of 100° C. and a humidity of 100%, and then the detachment strength was determined in accordance with JIS K 5600-5-6. The detachment strength measured was evaluated as follows. The results are indicated in Table 1.

The evaluation criterion by measurement of the detachment strength is 0 or 1 (i.e., 1 or less): ⊚ (Very good)

The evaluation criterion by measurement of the detachment strength is 2: ○ (Good)

The evaluation criterion by measurement of the detachment strength is from 3 to 5 (i.e., 3 or more): X (Bad)

<Transparency of Phase Difference Layer>

The transparency of a phase difference layer formed in an optical element was evaluated by measurement of the haze in the thickness direction of the phase difference layer. The haze of a phase difference layer was measured in accordance with JIS K 7136. Upon the measurement of the haze of a phase difference layer, an "NDH-2000" available from Nippon Denshoku Co., Ltd. was used as measurement apparatus. The results are shown in Table 1.

Example 1-2

A phase difference layer was fabricated and evaluated in the same manner as in Example 1-1, except that the value relative to blend conversion of the multifunctional compound was 10% by weight. The evaluation results are shown in Table 1.

Example 1-3

A phase difference layer was fabricated and evaluated in the same manner as in Example 1-1, except that bisphenol-A-glycidyl methacrylate (Epoxy Ester 3000M available from Kyoeisha Chemical Co., Ltd.) was used as the multifunctional compound. The evaluation results are shown in Table 1.

Example 1-4

A phase difference layer was fabricated and evaluated in the same manner as in Example 1-1, except that pentaerythritol triacrylate (M-305 available from TOAGOSEI Co., Ltd.) was used as the multifunctional compound. The evaluation results are shown in Table 1.

Example 1-5

A phase difference layer was fabricated and evaluated in the same manner as in Example 1-1, except that 5% by weight of epoxylated 3-cyclohexene-1,2-dicarboxylate-bis(3-cyclohexenylmethyl) modified e-caprolactone (GT301 available from Daicel Chemical Co., Ltd.) was used as the alicyclic epoxy compound. The evaluation results are shown in Table 1.

Example 1-6

A phase difference layer was fabricated and evaluated in the same manner as in Example 1-1, except that 1% by weight of bis[3-(triethoxysilyl)propyl]disulfide (SIB1824.6 available from Gelest, Inc.) was used as the sulfide silane coupling agent. The evaluation results are shown in Table 1.

Example 1-7

A phase difference layer was fabricated in the same manner as in Example 1-1, except that a colored layer was formed between the glass substrate and the phase difference layer by use of the colored resist below. The orientation state, hardness and base material adhesion properties of the phase difference layer were evaluated in the same manner as in Example 1-1. The evaluation results are shown in Table 1.

<Photoresist Composition for Red (R) Coloring Pixel>

| | |
|---|---|
| Red pigment | 5.0 parts by weight |
| (C. I. PR254 (Chromophtal DPP Red BP, available from Ciba Specialty Chemicals Co., Ltd.)) | |
| Yellow pigment | 1.0 part by weight |
| (C. I. PY139 (Paliotol Yellow D1819, available from BASF Corp.)) | |
| Dispersant | 3.0 parts by weight |
| (Solsperse 24000, available from Zeneca) | |
| Multifunctional acrylate monomer | 4.0 parts by weight |
| (SR399, available from Sartomer Company, Inc.) | |
| Polymer | 5.0 parts by weight |
| (VR60, available from Showa Highpolymer Co., Ltd.) | |
| Photopolymerization initiator 1 | 1.4 parts by weight |
| (Irgacure 907, available from Nihon Chiba-Geigy K.K.) | |
| Photopolymerization initiator 2 | 0.6 parts by weight |
| (2,2'-bis(o-chlorophenyl)-4,5,4',5'-tetraphenyl-1,2'-biimidazol) | |
| Solvent | 80.0 parts by weight |
| Propylene glycol monomethyl ether acetate | |

The colored resist was applied onto the transparent substrate by a spin coat method, prebaked at 90° C. for 3 minutes and alignment light-exposed (100 mJ/cm$^2$), and then postbaked at 230° C. for 30 minutes to form a red monochromic colored layer having a film thickness of 2.0 μm. Subsequently, the colored layer was ultraviolet-ray cleaned with an ultraviolet ray with a wavelength of 254 nm at an energy of 900 mJ/cm$^2$ by means of an ultraviolet-ray cleaning apparatus (trade name OC-2506, available from Iwasaki Electric Co., Ltd.).

Reference Example 1-1

A phase difference layer was fabricated and evaluated in the same manner as in Example 1-1, except that the value relative to blend conversion of the multifunctional compound was 3.0% by weight. The evaluation results are indicated in Table 1.

Reference Example 1-2

A phase difference layer was fabricated and evaluated in the same manner as in Example 1-1, except that the value relative to blend conversion of the multifunctional compound was 25% by weight. The evaluation results are indicated in Table 1.

Reference Example 1-3

A phase difference layer was fabricated and evaluated in the same manner as in Example 1-1, except that the value relative to blend conversion of the alicyclic epoxy compound was 0.05% by weight. The evaluation results are indicated in Table 1.

Reference Example 1-4

A phase difference layer was fabricated and evaluated in the same manner as in Example 1-1, except that the value relative to blend conversion of the alicyclic epoxy compound was 25% by weight. The evaluation results are indicated in Table 1.

Reference Example 1-5

A phase difference layer was fabricated and evaluated in the same manner as in Example 1-1, except that 20% by weight of, hydroquinoneglycidyl ether of an aromatic epoxy compound (Denacol EX-203 available from Nagase ChemteX Corp.) was used in place of the alicyclic epoxy compound. The evaluation results are indicated in Table 1.

Reference Example 1-6

A phase difference layer was fabricated and evaluated in the same manner as in Example 1-1, except that 20% by weight of ethylene glycol diglycidyl ether of a linear chain epoxy compound (Epolight 40E available from Kyoeisha Chemical Co., Ltd.) was used in place of the alicyclic epoxy compound. The evaluation results are indicated in Table 1.

Reference Example 1-7

A phase difference layer was fabricated and evaluated in the same manner as in Example 1-1, except that an epoxy polymer having a number average molecular weight of 3000 prepared by polymerizing 1,2:8,9-diepoxylimonene (Seroxide 3000 available from Daicel Chemical Co., Ltd.) was used as the alicyclic epoxy compound. The evaluation results are indicated in Table 1.

Comparative Example 1-1

A phase difference layer was fabricated and evaluated in the same manner as in Example 1-1, except that no multifunctional compound was used. The evaluation results are indicated in Table 1.

Comparative Example 1-2

A phase difference layer was fabricated and evaluated in the same manner as in Example 1-1, except that no alicyclic epoxy compound was used. The evaluation results are indicated in Table 1.

Comparative Example 1-3

A phase difference layer was fabricated in the same manner as in Example 1-7, except that no sulfide silane coupling agent was used. The orientation state, hardness and base material adhesion properties of the phase difference layer were evaluated in the same manner as in Example 1-7. The evaluation results are indicated in Table 1.

Comparative Example 1-4

A phase difference layer was fabricated and evaluated in the same manner as in Example 1-1, except that 20% by weight of trimethylolpropane triacrylate having no alcoholic hydroxyl group in its molecular structure (M-309 available from TOAGOSEI Co., Ltd.) was used as the multifunctional compound. The evaluation results are indicated in Table 1.

Comparative Example 1-5

A phase difference layer was fabricated and evaluated in the same manner as in Example 1-1, except that pentaerythritol tetraacrylate having no alcoholic hydroxyl group in its molecular structure (Light Acrylate PE-4A available from Kyoeisha Chemical Co., Ltd.) was used as the multifunctional compound. The evaluation results are indicated in Table 1.

Comparative Example 1-6

A phase difference layer was fabricated and evaluated in the same manner as in Example 1-1, except that 20% by weight of 2-(3,4-epoxycyclohexyl)ethyltrimethoxysilane (KBM-303 available from Shin-Etsu Chemical Co., Ltd.) was used in place of the sulfide silane coupling agent. The evaluation results are indicated in Table 1.

Comparative Example 1-7

A phase difference layer and colored layer were fabricated in the same manner as in Example 1-7, except that 20% by weight of 2-(3,4-epoxycyclohexyl)ethyltrimethoxysilane (KBM-303 available from Shin-Etsu Chemical Co., Ltd.) was used in place of the sulfide silane coupling agent. The orientation state, hardness and base material adhesion properties of the phase difference layer were evaluated in the same manner as in Example 1-7. The evaluation results are indicated in Table 1.

TABLE 1

| | Orientation Properties | Hardness | Base Material Adhesion Properties | Haze |
|---|---|---|---|---|
| Example 1-1 | ⊚ | ⊚ | ⊚ | 1.8 |
| Example 1-2 | ⊚ | ⊚ | ⊚ | 2.1 |
| Example 1-3 | ⊚ | ⊚ | ⊚ | 1.8 |
| Example 1-4 | ⊚ | ⊚ | ⊚ | 1.8 |
| Example 1-5 | ⊚ | ⊚ | ⊚ | 1.8 |
| Example 1-6 | ⊚ | ⊚ | ⊚ | 1.8 |
| Example 1-7 | ⊚ | ⊚ | ⊚ | — |

TABLE 1-continued

| | Orientation Properties | Hardness | Base Material Adhesion Properties | Haze |
|---|---|---|---|---|
| Reference Example 1-1 | ◎ | ○ | ◎ | 1.8 |
| Reference Example 1-2 | ○ | ◎ | ◎ | 2.3 |
| Reference Example 1-3 | ◎ | ◎ | ○ | 1.8 |
| Reference Example 1-4 | ○ | ◎ | ◎ | 2.3 |
| Reference Example 1-5 | ◎ | ◎ | ○ | 2.3 |
| Reference Example 1-6 | ◎ | ◎ | ○ | 2.3 |
| Reference Example 1-7 | ○ | ◎ | ○ | 3.8 |
| Comparative Example 1-1 | ◎ | X | ○ | 1.8 |
| Comparative Example 1-2 | ◎ | ◎ | X | 1.8 |
| Comparative Example 1-3 | X | ◎ | ○ | — |
| Comparative Example 1-4 | ○ | X | ○ | 2.3 |
| Comparative Example 1-5 | ○ | X | ○ | 1.8 |
| Comparative Example 1-6 | X | ◎ | ○ | 2.5 |
| Comparative Example 1-7 | X | ◎ | ○ | — |

Example 2-1

A phase difference layer was fabricated and evaluated in the same manner as in Example 1-1, except that 3-mercaptopropylmethyl dimethoxysilane of a mercapto silane coupling agent (KBM-802 available from Shin-Etsu Chemical Co., Ltd.) was used in place of the silane coupling agent. The evaluation results are indicated in Table 2.

Example 2-2

A phase difference layer was fabricated and evaluated in the same manner as in Example 2-1, except that the value relative to blend conversion of the multifunctional compound was 10% by weight. The evaluation results are indicated in Table 2.

Example 2-3

A phase difference layer was fabricated and evaluated in the same manner as in Example 2-1, except that bisphenol-A-glycidyl methacrylate (Epoxy Ester 3000M available from Kyoeisha Chemical Co., Ltd.) was used as the multifunctional compound. The evaluation results are shown in Table 2.

Example 2-4

A phase difference layer was fabricated and evaluated in the same manner as in Example 2-1, except that pentaerythritol triacrylate (M-305 available from TOAGOSEI Co., Ltd.) was used as the multifunctional compound. The evaluation results are shown in Table 2.

Example 2-5

A phase difference layer was fabricated and evaluated in the same manner as in Example 2-1, except that 5% by weight of epoxylated 3-cyclohexene-1,2-dicarboxylate-bis(3-cyclohexenylmethyl) modified ε-caprolactone (GT301 available from Daicel Chemical Co., Ltd.) was used as the alicyclic epoxy compound. The evaluation results are shown in Table 2.

Example 2-6

A phase difference layer was fabricated and evaluated in the same manner as in Example 2-1, except that 1% by weight of 3-mercaptopropyltrimethoxysilane (KBM-803 available from Shin-Etsu Chemical Co., Ltd.) was used as the mercapto silane coupling agent. The evaluation results are indicated in Table 2.

Example 2-7

A phase difference layer was fabricated in the same manner as in Example 2-1, except that a colored layer similar to Example 1-7 was formed in between the glass substrate and the phase difference layer. The orientation state, hardness and base material adhesion properties of the phase difference layer were evaluated in the same manner as in Example 2-1. The evaluation results are indicated in Table 2.

Reference Example 2-1

A phase difference layer was fabricated and evaluated in the same manner as in Example 2-1, except that the value relative to blend conversion of the multifunctional compound was 3.0% by weight. The evaluation results are indicated in Table 2.

Reference Example 2-2

A phase difference layer was fabricated and evaluated in the same manner as in Example 2-1, except that the value relative to blend conversion of the multifunctional compound was 25% by weight. The evaluation results are indicated in Table 2.

Reference Example 2-3

A phase difference layer was fabricated and evaluated in the same manner as in Example 2-1, except that the value relative to blend conversion of the alicyclic epoxy compound was 0.05% by weight. The evaluation results are indicated in Table 2.

Reference Example 2-4

A phase difference layer was fabricated and evaluated in the same manner as in Example 2-1, except that the value relative to blend conversion of the alicyclic epoxy compound was 25% by weight. The evaluation results are indicated in Table 2.

Reference Example 2-5

A phase difference layer was fabricated and evaluated in the same manner as in Example 2-1, except that 20% by weight of hydroquinoneglycidyl ether of an aromatic epoxy compound (Denacol EX-203 available from Nagase ChemteX Corp.) was used in place of the alicyclic epoxy compound. The evaluation results are indicated in Table 2.

Reference Example 2-6

A phase difference layer was fabricated and evaluated in the same manner as in Example 2-1, except that 20% by weight of ethylene glycol diglycidyl ether of a linear chain epoxy compound (Epolight 40E available from Kyoeisha Chemical Co., Ltd.) was used in place of the alicyclic epoxy compound. The evaluation results are indicated in Table 2.

Reference Example 2-7

A phase difference layer was fabricated and evaluated in the same manner as in Example 2-1, except that an epoxy polymer having a number average molecular weight of 3000 prepared by polymerizing 1,2:8,9-diepoxylimonene (Seroxide 3000 available from Daicel Chemical Co., Ltd.) was used as the alicyclic epoxy compound. The evaluation results are indicated in Table 2.

Comparative Example 2-1

A phase difference layer was fabricated and evaluated in the same manner as in Example 2-1, except that no multifunctional compound was used. The evaluation results are indicated in Table 2.

Comparative Example 2-2

A phase difference layer was fabricated and evaluated in the same manner as in Example 2-1, except that no aliphatic epoxy compound was used. The evaluation results are indicated in Table 2.

Comparative Example 2-3

A phase difference layer was fabricated in the same manner as in Example 2-7, except that no mercapto silane coupling agent was used. The orientation state, hardness and base material adhesion properties of the phase difference layer were evaluated in the same manner as in Example 2-7. The evaluation results are indicated in Table 2.

Comparative Example 2-4

A phase difference layer was fabricated and evaluated in the same manner as in Example 2-1, except that 20% by weight of trimethylolpropane triacrylate (M-309 available from TOAGOSEI Co., Ltd.) was used as the multifunctional compound. The evaluation results are indicated in Table 2.

Comparative Example 2-5

A phase difference layer was fabricated and evaluated in the same manner as in Example 2-1, except that pentaerythritol tetraacrylate (Light Acrylate PE-4A available from Kyoeisha Chemical Co., Ltd.) was used as the multifunctional compound. The evaluation results are indicated in Table 2.

Comparative Example 2-6

A phase difference layer was fabricated and evaluated in the same manner as in Example 2-1, except that 1.0% by weight of 3-glycidoxy-propyl trimethoxysilane (KBM-403 available from Shin-Etsu Chemical Co., Ltd.) was used in place of the mercapto silane coupling agent. The evaluation results are indicated in Table 2.

Comparative Example 2-7

A phase difference layer and colored layer were fabricated in the same manner as in Example 2-7, except that 1.0% by weight of 3-glycidoxy-propyl trimethoxysilane (KBM-403 available from Shin-Etsu Chemical Co., Ltd.) was used in place of the mercapto silane coupling agent. The orientation state, hardness and base material adhesion properties of the phase difference layer were evaluated in the same manner as in Example 2-7. The evaluation results are indicated in Table 2.

TABLE 2

| | Orientation Properties | Hardness | Base Material Adhesion Properties | Haze |
|---|---|---|---|---|
| Example 2-1 | ◎ | ◎ | ◎ | 1.3 |
| Example 2-2 | ◎ | ◎ | ◎ | 1.6 |
| Example 2-3 | ◎ | ◎ | ◎ | 1.3 |
| Example 2-4 | ◎ | ◎ | ◎ | 1.3 |
| Example 2-5 | ◎ | ◎ | ◎ | 1.3 |
| Example 2-6 | ◎ | ◎ | ◎ | 1.3 |
| Example 2-7 | ◎ | ◎ | ◎ | — |
| Reference Example 2-1 | ◎ | ○ | ◎ | 1.3 |
| Reference Example 2-2 | ○ | ◎ | ◎ | 1.8 |
| Reference Example 2-3 | ◎ | ◎ | ○ | 1.3 |
| Reference Example 2-4 | ○ | ◎ | ◎ | 1.8 |
| Reference Example 2-5 | ◎ | ◎ | ○ | 1.8 |
| Reference Example 2-6 | ◎ | ◎ | ○ | 1.8 |
| Reference Example 2-7 | ○ | ◎ | ○ | 3.5 |
| Comparative Example 2-1 | ◎ | X | ○ | 1.3 |
| Comparative Example 2-2 | ◎ | ◎ | X | 1.3 |
| Comparative Example 2-3 | X | ◎ | ○ | — |
| Comparative Example 2-4 | ○ | X | ○ | 1.8 |
| Comparative Example 2-5 | ○ | X | ○ | 1.3 |
| Comparative Example 2-6 | X | ◎ | ○ | 2.0 |
| Comparative Example 2-7 | X | ◎ | ○ | — |

Example 3-1

A phase difference layer was fabricated and evaluated in the same manner as in Example 1-1, except that 0.01% by weight of N-2-(aminoethyl)-3-aminopropylmethyl dimethoxysilane of an amino silane coupling agent (KBM-602 available from Shin-Etsu Chemical Co., Ltd.) was used in a value relative to blend conversion as the silane coupling agent. The evaluation results are indicated in Table 3.

Example 3-2

A phase difference layer was fabricated and evaluated in the same manner as in Example 3-1, except that the value relative to blend conversion of the multifunctional compound was 10% by weight. The evaluation results are indicated in Table 3.

Example 3-3

A phase difference layer was fabricated and evaluated in the same manner as in Example 3-1, except that bisphenol-A-glycidyl methacrylate (Epoxy Ester 3000M available from Kyoeisha Chemical Co., Ltd.) was used as the multifunctional compound. The evaluation results are shown in Table 3.

Example 3-4

A phase difference layer was fabricated and evaluated in the same manner as in Example 3-1, except that pentaerythritol triacrylate (M-305 available from TOAGOSEI Co., Ltd.) was used as the multifunctional compound. The evaluation results are shown in Table 3.

Example 3-5

A phase difference layer was fabricated and evaluated in the same manner as in Example 3-1, except that 5% by weight of epoxylated 3-cyclohexene-1,2-dicarboxylate-bis(3-cyclohexenylmethyl) modified ε-caprolactone (GT301 available from Daicel Chemical Co., Ltd.) was used as the alicyclic epoxy compound. The evaluation results are shown in Table 3.

Example 3-6

A phase difference layer was fabricated and evaluated in the same manner as in Example 3-1, except that 0.01% by weight of 3-triethoxysilyl-N-(1,3-dimethyl-butylidene)propylamine (KBE-9103 available from Shin-Etsu Chemical Co., Ltd.) was used as the amino silane coupling agent. The evaluation results are indicated in Table 3.

Example 3-7

A phase difference layer was fabricated and evaluated in the same manner as in Example 3-1, except that 0.01% by weight of N-2-(aminoethyl)-3-aminopropyltrimethoxysilane (KBM-602 available from Shin-Etsu Chemical Co., Ltd.) was used as the amino silane coupling agent. The evaluation results are indicated in Table 3.

Example 3-8

A phase difference layer was fabricated and evaluated in the same manner as in Example 3-1, except that 0.01% by weight of 3-amionpropyl trimethoxysilane (KBM-903 available from Shin-Etsu Chemical Co., Ltd.) was used as the amino silane coupling agent. The evaluation results are indicated in Table 3.

Example 3-9

A phase difference layer was fabricated and evaluated in the same manner as in Example 3-1, except that 20.0% by weight of 3-triethoxysilyl-N-(1,3-dimethyl-butylidene)propylamine (KBE-9103 available from Shin-Etsu Chemical Co., Ltd.) was used as the amino silane coupling agent. The evaluation results are indicated in Table 3.

Example 3-10

A phase difference layer was fabricated in the same manner as in Example 3-1, except that a colored layer similar to that of Example 1-7 was formed in between the glass substrate and the phase difference layer. The orientation state, hardness and base material adhesion properties of the phase difference layer were evaluated in the same manner as in Example 3-1. The evaluation results are indicated in Table 3.

Reference Example 3-1

A phase difference layer was fabricated and evaluated iii the same manner as in Example 3-1, except that the value relative to blend conversion of the multifunctional compound was 3.0% by weight. The evaluation results are indicated in Table 3.

Reference Example 3-2

A phase difference layer was fabricated and evaluated in the same manner as in Example 3-1, except that the value relative to blend conversion of the multifunctional compound was 25% by weight. The evaluation results are indicated in Table 3.

Reference Example 3-3

A phase difference layer was fabricated and evaluated in the same manner as in Example 3-1, except that the value relative to blend conversion of the alicyclic epoxy compound was 0.05% by weight. The evaluation results are indicated in Table 3.

Reference Example 3-4

A phase difference layer was fabricated and evaluated in the same manner as in Example 3-1, except that the value relative to blend conversion of the alicyclic epoxy compound was 25% by weight. The evaluation results are indicated in Table 3.

Reference Example 3-5

A phase difference layer was fabricated and evaluated in the same manner as in Example 3-1, except that 20% by weight of hydroquinoneglycidyl ether of an aromatic epoxy compound (Denacol EX-203 available from Nagase ChemteX Corp.) was used in place of the alicyclic epoxy compound. The evaluation results are indicated in Table 3.

Reference Example 3-6

A phase difference layer was fabricated and evaluated in the same manner as in Example 3-1, except that 20% by weight of ethylene glycol diglycidyl ether of a linear chain epoxy compound (Epolight 40E available from Kyoeisha Chemical Co., Ltd.) was used in place of the alicyclic epoxy compound. The evaluation results are indicated in Table 3.

Reference Example 3-7

A phase difference layer was fabricated and evaluated in the same manner as in Example 3-1, except that an epoxy polymer having a number average molecular weight of 3000 prepared by polymerizing 1,2:8,9-diepoxylimonene (Seroxide 3000 available from Daicel Chemical Co., Ltd.) was used as the alicyclic epoxy compound. The evaluation results are indicated in Table 3.

Comparative Example 3-1

A phase difference layer was fabricated and evaluated in the same manner as in Example 3-1, except that no multifunctional compound was used. The evaluation results are indicated in Table 3.

Comparative Example 3-2

A phase difference layer was fabricated and evaluated in the same manner as in Example 3-1, except that no alicyclic epoxy compound was used. The evaluation results are indicated in Table 3.

Comparative Example 3-3

A phase difference layer was fabricated as in Example 3-10, except that no amino silane coupling agent was used. The orientation state, hardness and base material adhesion properties of the phase difference layer were evaluated in the same manner as in Example 3-10. The evaluation results are indicated in Table 3.

Comparative Example 3-4

A phase difference layer was fabricated and evaluated in the same manner as in Example 3-1, except that 20% by weight of trimethylolpropane triacrylate (M-309 available from TOAGOSEI Co., Ltd.) was used as the multifunctional compound. The evaluation results are indicated in Table 3.

Comparative Example 3-5

A phase difference layer was fabricated and evaluated in the same manner as in Example 3-1, except that pentaerythritol tetraacrylate (Light Acrylate PE-4A available from Kyoeisha Chemical Co., Ltd.) was used as the multifunctional compound. The evaluation results are indicated in Table 3.

Comparative Example 3-6

A phase difference layer was fabricated and evaluated in the same manner as in Example 3-1, except that 10.0% by weight of 3-chloropropyl trimethoxysilane (KBM-703 available from Shin-Etsu Chemical Co., Ltd.) was used in place of the amino silane coupling agent. The evaluation results are indicated in Table 3.

Comparative Example 3-7

A phase difference layer and colored layer were fabricated in the same manner as in Example 3-10, except that 10.0% by weight of 3-chloropropyl trimethoxysilane (KBM-703 available from Shin-Etsu Chemical Co., Ltd.) was used in place of the amino silane coupling agent. The orientation state, hardness and base material adhesion properties of the phase difference layer were evaluated in the same manner as in Example 3-10. The evaluation results are indicated in Table 3.

Comparative Example 3-8

A phase difference layer was fabricated and evaluated in the same manner as in Example 3-1, except that no silane coupling agent was used. The evaluation results are indicated in Table 3.

TABLE 3

|  | Orientation Properties | Hardness | Base Material Adhesion Properties | Haze |
| --- | --- | --- | --- | --- |
| Example 3-1 | ◉ | ◉ | ◉ | 0.8 |
| Example 3-2 | ◉ | ◉ | ◉ | 1.1 |
| Example 3-3 | ◉ | ◉ | ◉ | 0.8 |
| Example 3-4 | ◉ | ◉ | ◉ | 0.8 |
| Example 3-5 | ◉ | ◉ | ◉ | 0.8 |
| Example 3-6 | ◉ | ◉ | ◉ | 0.05 |
| Example 3-7 | ◉ | ◉ | ◉ | 0.8 |
| Example 3-8 | ◉ | ◉ | ◉ | 1.5 |
| Example 3-9 | ◉ | ◉ | ◉ | 0.08 |
| Example 3-10 | ◉ | ◉ | ◉ | — |
| Reference Example 3-1 | ◉ | ○ | ◉ | 0.8 |
| Reference Example 3-2 | ○ | ◉ | ◉ | 1.3 |
| Reference Example 3-3 | ◉ | ◉ | ○ | 0.8 |
| Reference Example 3-4 | ○ | ◉ | ◉ | 1.3 |
| Reference Example 3-5 | ◉ | ◉ | ○ | 1.3 |
| Reference Example 3-6 | ◉ | ◉ | ○ | 1.3 |
| Reference Example 3-7 | ○ | ◉ | ○ | 3.7 |
| Comparative Example 3-1 | ◉ | X | ○ | 0.8 |
| Comparative Example 3-2 | ◉ | ◉ | X | 0.8 |
| Comparative Example 3-3 | X | ◉ | ○ | — |
| Comparative Example 3-4 | ○ | X | ○ | 1.3 |
| Comparative Example 3-5 | ○ | X | ○ | 0.8 |
| Comparative Example 3-6 | X | ◉ | ○ | 3.1 |
| Comparative Example 3-7 | X | ◉ | ○ | — |
| Comparative Example 3-8 | ○ | X | X | 0.2 |

Example 4-1

A phase difference layer was fabricated and evaluated in the same manner as in Example 1-1, except that 3-methacryloxypropylmethyl dimethoxysilane of a (meth)acryloyl silane coupling agent (KBE-502 available from Shin-Etsu Chemical Co., Ltd.) was used as the silane coupling agent. The evaluation results are indicated in Table 4.

Example 4-2

A phase difference layer was fabricated and evaluated in the same manner as in Example 4-1, except that the value relative to blend conversion of the alcoholic multifunctional compound was 10% by weight. The evaluation results are indicated in Table 4.

Example 4-3

A phase difference layer was fabricated and evaluated in the same manner as in Example 4-1, except that bisphenol-A-glycidyl methacrylate (Epoxy Ester 3000M available from Kyoeisha Chemical Co., Ltd.) was used as the multifunctional compound. The evaluation results are shown in Table 4.

Example 4-4

A phase difference layer was fabricated and evaluated in the same manner as in Example 4-1, except that pentaerythritol triacrylate (M-305 available from TOAGOSEI Co., Ltd.) was used as the multifunctional compound. The evaluation results are shown in Table 1.

Example 4-5

A phase difference layer was fabricated and evaluated in the same manner as in Example 4-1, except that 5% by weight of epoxylated 3-cyclohexene-1,2-dicarboxylate-bis(3-cyclo-hexenylmethyl) modified ε-caprolactone (GT301 available from Daicel Chemical Co., Ltd.) was used as the alicyclic epoxy compound. The evaluation results are shown in Table 4.

Example 4-6

A phase difference layer was fabricated and evaluated in the same manner as in Example 4-1, except that 1% by weight of 3-methacryloxypropyltriethoxysilane (KBE-503 available from Shin-Etsu Chemical Co., Ltd.) was used as the (meth) acryloyl silane coupling agent. The evaluation results are indicated in Table 4.

Example 4-7

A phase difference layer was fabricated as in Example 4-1, except that a colored layer similar to that of Example 1-7 was formed in between the glass substrate and the phase difference layer. The orientation state, hardness and base material adhesion properties of the phase difference layer were evaluated in the same manner as in Example 4-1. The evaluation results are indicated in Table 4.

Reference Example 4-1

A phase difference layer was fabricated and evaluated in the same manner as in Example 4-1, except that the value relative to blend conversion of the multifunctional compound was 3.0% by weight. The evaluation results are indicated in Table 4.

Reference Example 4-2

A phase difference layer was fabricated and evaluated in the same manner as in Example 4-1, except that the value relative to blend conversion of the multifunctional compound was 25% by weight. The evaluation results are indicated in Table 4.

Reference Example 4-3

A phase difference layer was fabricated and evaluated in the same manner as in Example 4-1, except that the value relative to blend conversion of the alicyclic epoxy compound was 0.05% by weight. The evaluation results are indicated in Table 4.

Reference Example 4-4

A phase difference layer was fabricated and evaluated in the same manner as in Example 4-1, except that the value relative to blend conversion of the alicyclic epoxy compound was 25% by weight. The evaluation results are indicated in Table 4.

Reference Example 4-5

A phase difference layer was fabricated and evaluated in the same manner as in Example 4-1, except that 20% by weight of hydroquinoneglycidyl ether of an aromatic epoxy compound (Denacol EX-203 available from Nagase ChemteX Corp.) was used in place of the alicyclic epoxy compound. The evaluation results are indicated in Table 4.

Reference Example 4-6

A phase difference layer was fabricated and evaluated in the same manner as in Example 4-1, except that 20% by weight of ethylene glycol diglycidyl ether of a linear chain epoxy compound (Epolight 40E available from Kyoeisha Chemical Co., Ltd.) was used in place of the alicyclic epoxy compound. The evaluation results are indicated in Table 4.

Reference Example 4-7

A phase difference layer was fabricated and evaluated in the same manner as in Example 4-1, except that an epoxy polymer having a number average molecular weight of 3000 prepared by polymerizing 1,2:8,9-diepoxylimonene (Seroxide 3000 available from Daicel Chemical Co., Ltd.) was used as the alicyclic epoxy compound. The evaluation results are indicated in Table 4.

Comparative Example 4-1

A phase difference layer was fabricated and evaluated in the same manner as in Example 4-1, except that no multifunctional compound was used. The evaluation results are indicated in Table 4.

Comparative Example 4-2

A phase difference layer was fabricated and evaluated in the same manner as in Example 4-1, except that no aliphatic epoxy compound was used. The evaluation results are indicated in Table 4.

Comparative Example 4-3

A phase difference layer was fabricated as in Example 4-7, except that no (meth)acryloyl silane coupling agent was used. The orientation state, hardness and base material adhesion properties of the phase difference layer were evaluated in the same manner as in Example 4-7. The evaluation results are indicated in Table 4.

Comparative Example 4-4

A phase difference layer was fabricated and evaluated in the same manner as in Example 4-1, except that 20% by weight of trimethylolpropane triacrylate (M-309 available from TOAGOSEI Co., Ltd.) was used as the multifunctional compound. The evaluation results are indicated in Table 4.

Comparative Example 4-5

A phase difference layer was fabricated and evaluated in the same manner as in Example 4-1, except that pentaerythritol tetraacrylate (Light Acrylate PE-4A available from Kyoeisha Chemical Co., Ltd.) was used as the multifunctional compound. The evaluation results are indicated in Table 4.

Comparative Example 4-6

A phase difference layer was fabricated and evaluated in the same manner as in Example 4-1, except that 20.0% by weight of vinyltrimethoxysilane (KBM-1003 available from Shin-Etsu Chemical Co., Ltd.) was used in place of the (meth) acryloyl silane coupling agent. The evaluation results are indicated in Table 4.

Comparative Example 4-7

A phase difference layer and colored layer were fabricated in the same manner as in Example 4-7, except that 20.0% by weight of vinyltrimethoxysilane (KBM-1003 available from Shin-Etsu Chemical Co., Ltd.) was used in place of the (meth) acryloyl silane coupling agent. The orientation state, hardness and base material adhesion properties of the phase difference layer were evaluated in the same manner as in Example 4-7. The evaluation results are indicated in Table 4.

TABLE 4

| | Orientation Properties | Hardness | Base Material Adhesion Properties | Haze |
|---|---|---|---|---|
| Example 4-1 | ◎ | ◎ | ◎ | 1.5 |
| Example 4-2 | ◎ | ◎ | ◎ | 1.8 |
| Example 4-3 | ◎ | ◎ | ◎ | 1.5 |
| Example 4-4 | ◎ | ◎ | ◎ | 1.5 |
| Example 4-5 | ◎ | ◎ | ◎ | 1.5 |
| Example 4-6 | ◎ | ◎ | ◎ | 1.5 |
| Example 4-7 | ◎ | ◎ | ◎ | — |
| Reference Example 4-1 | ◎ | ○ | ◎ | 1.5 |
| Reference Example 4-2 | ○ | ◎ | ◎ | 2.0 |
| Reference Example 4-3 | ◎ | ◎ | ○ | 1.5 |
| Reference Example 4-4 | ○ | ◎ | ◎ | 2.0 |
| Reference Example 4-5 | ◎ | ◎ | ○ | 2.0 |
| Reference Example 4-6 | ◎ | ◎ | ○ | 2.0 |
| Reference Example 4-7 | ○ | ◎ | ○ | 3.3 |
| Comparative Example 4-1 | ◎ | X | ○ | 1.5 |
| Comparative Example 4-2 | ◎ | ◎ | X | 1.5 |
| Comparative Example 4-3 | X | ◎ | ○ | — |
| Comparative Example 4-4 | ○ | X | ○ | 2.0 |
| Comparative Example 4-5 | ○ | X | ○ | 1.5 |
| Comparative Example 4-6 | X | ◎ | ○ | 3.8 |
| Comparative Example 4-7 | X | ◎ | ○ | — |

Tables 1 to 4 show that a phase difference layer obtained by a liquid crystal composition concerning each example of the invention can improve the hardness, base material adhesion properties and transparency while well maintaining the perpendicular orientation properties of liquid crystal molecules contained in the phase difference layer. In the comparative examples, on the other hand, any of the perpendicular orientation properties of liquid crystal molecules, and the hardness, base material adhesion properties or transparency of a phase difference layer became failure.

As a result, it is understood that the addition of a sulfide, mercapto, amino or (meth)acryloyl silane coupling agent to a liquid crystal composition of the invention improves the perpendicular orientation properties of liquid crystal molecules and the addition of both an alcoholic multifunctional compound and alicyclic epoxy compound synergistically improves the hardness and base material adhesion properties of a phase difference layer.

Additionally, it has been found that, in the study for achievement of the invention, surprisingly, hazes are very slight in Examples 3-6 and 3-9 provided with a phase difference layer formed by use of a liquid crystal composition containing a ketimine silane coupling agent.

A haze is generally understood as an index indicating the transparency of a phase difference layer. Although only a haze is not an index for the determination of the performance of a color filter, a display apparatus using a color filter provided with a phase difference layer having a light haze can provide a high contrast ratio and a view angle modification effect, thereby offering an image of high quality.

The trend of hazes indicated in the above examples and comparative examples is as follows. In other words, as compared with the haze of Comparative Example 3-8 having no silane coupling agent blended therein, the hazes of Comparative Examples 1-6, 2-6, 3-6 and 4-6 having a silane coupling agent blended therein are clearly thick. The fact that, in the latter comparative examples having a silane coupling agent blended therein, a new additive of a silane coupling agent is contained in a liquid crystal composition used for forming a phase difference layer seems to be one factor.

On the contrary, even in the other examples and reference examples excluding Examples 3-6 and 3-9, the hazes are thick as compared with that of Comparative Example 3-8, so that it has suggested that, as in Comparative Examples 1-6, 2-6, 3-6 and 4-6, the presence of a silane coupling agent in a liquid crystal composition makes the haze thick.

However, as compared with Comparative Examples 1-6, 2-6, 3-6 and 4-6, the hazes of the examples and reference examples have a trend of being equivalent thereto or lower than those.

Consequently, it has been suggested that, as a preferred trend of the present invention, a color filter of the invention has an effect of thinly restraining the haze, as compared with a color filter provided with a phase difference layer formed by use of a liquid crystal composition to which a silane coupling agent is added excluding a specific silane coupling agent in the invention.

Furthermore, Examples 3-6 and 3-9 having a ketimine silane coupling agent blended therein were shown to be extremely thin in haze as compared with Comparative Examples 1-6, 2-6, 3-6 and 4-6 and the other examples and reference examples. Additionally, further surprisingly, the hazes in Examples 3-6 and 3-9 clearly exhibit low values, as compared with Comparative Example 3-8 having no silane coupling agent added thereto.

The mechanism of decreases in the above hazes that seem to be attributable to the presence of a ketimine silane coupling agent is not clear yet. However, the present inventors have identified that the addition of a silane coupling agent to a crosslinkable liquid crystal composition generally leads to bad compatibility, while the addition of a ketimine silane coupling agent shows very good compatibility. It is estimated that the effect of a decrease in haze that seems to be attributable to the presence of the above-mentioned ketimine silane coupling agent is largely associated with the good compatibility.

As described above, the present invention attains a desired object of improving adhesion properties of a phase difference layer to the base material surface. In particular, the invention using a ketimine silane coupling agent can particularly desirably well attain a desired object of the invention, from the viewpoints of being capable of solving the problem of the above poor adhesion properties and of rendering the haze to be restrained in a low value.

INDUSTRIAL APPLICABILITY

A crosslinkable liquid crystal composition of the invention can form a phase difference layer indicating good homeotropic orientation on a base layer without the presence of a perpendicular orientation film. Thus, for example, in a display apparatus such as a liquid crystal display apparatus, making the thickness of a liquid crystal cell thin and decreasing light scattering can be done and at the same time high quality image display can be provided.

The invention claimed is:

1. A liquid crystal composition, comprising:
   at least one crosslinkable liquid crystal compounds;
   at least one silane coupling agents selected from sulfide silane coupling agents, mercapto silane coupling agents, amino silane coupling agents and (meth)acryloyl silane coupling agents;
   a multifunctional compound having at least one alcoholic hydroxyl group and at least one polymerizable functional group in a molecular structure thereof; and
   an epoxy compound.

2. The liquid crystal composition according to claim 1, wherein
   the at least one crosslinkable liquid crystal compounds has at least one (meth)acryloyl group in one molecule.

3. The liquid crystal composition according to claim 1, wherein
   the at least one amino silane coupling agent is a ketimine silane coupling agent.

4. The liquid crystal composition according to claim 1, wherein
   the multifunctional compound is a multifunctional (meth)acrylate.

5. The liquid crystal composition according to claim 4, wherein
   the multifunctional (meth)acrylate is at least one compounds selected from the group consisting of 2-hydroxy-1-3-dimethacryloxypropane, 2-hydroxy-1-3-dimethacryloxypropane, 2-hydroxy-1-acryloxy-3-methacryloxypropane, ethylenebis[oxy(2-hydroxypropane-1,3-diyl)]dimethacrylate, (1-methyl-1,2-ethanediyl)bis[oxy(2-hydroxy-3,1-propanediyl)] diacrylate, bisphenol-A-glycidyl methacrylate, bisphenol-A-glycidyl acrylate and pentaerythritoldiacrylate monostearate.

6. The liquid crystal composition according to claim 4, wherein
   the multifunctional (meth)acrylate is pentaerythritol triacrylate.

7. The liquid crystal composition according to claim 4, wherein
   the multifunctional (meth)acrylate is dipentaerythritol hydroxy pentaacrylate.

8. The liquid crystal composition according to claim 1, wherein
   the epoxy compound is an alicyclic epoxy compound having an epoxy group within an alicyclic alkyl group.

9. The liquid crystal composition according to claim 1, wherein
   the epoxy compound has at least two epoxy groups in a molecular structure of the epoxy compound.

10. The liquid crystal composition according to claim 1, wherein
    the epoxy compound has a polymerization degree of 1 or more and less than 10.

11. The liquid crystal composition according to claim 1, wherein
    a number average molecular weight of the epoxy compound is 1000 or less.

12. The liquid crystal composition according to claim 1, wherein
    the liquid crystal composition contains 0.01 to 20% by weight of the at least one silane coupling agent in a value relative to blend conversion.

13. The liquid crystal composition according to claim 1, wherein
    the liquid crystal composition contains 5 to 20% by weight of the multifunctional compound in a value relative to blend conversion.

14. The liquid crystal composition according to claim 1, wherein
    the liquid crystal composition contains 1 to 20% by weight of the epoxy compound in a value relative to blend conversion.

15. A color filter produced by directly or indirectly laminating at least a colored layer and a phase difference layer on a transparent substrate in this order or in reverse order, wherein
    the phase difference layer is formed by crosslinking polymerization of crosslinkable liquid crystal compounds with each other in a state in which the crosslinkable liquid crystal compounds contained in the liquid crystal composition recited in claim 1 are oriented.

16. A color filter produced by directly or indirectly laminating a colored layer and a phase difference layer on a transparent substrate in this order, wherein
    the phase difference layer is formed by directly applying the liquid crystal composition recited in claim 1 onto the colored layer to form a liquid crystal coating film, orienting the crosslinkable liquid crystal composition contained in the liquid crystal coating film, and then irradiating the surface of the liquid crystal coating film with active radiation rays to start crosslinking polymerization of the crosslinkable liquid crystal compounds with each other.

17. A color filter produced by directly or indirectly laminating a colored layer and a phase difference layer on a transparent substrate in this order, wherein
    the phase difference layer is formed by directly applying a composition onto the colored layer to form a liquid crystal coating film, the composition comprising the liquid crystal composition of claim 1 together with a photopolymerization initiator such that the composition contains at least (a) 70 to 93.89% by weight of the at least one crosslinkable liquid crystal compound, (b) 0.1 to 10% by weight of the photopolymerization initiator, (c) 0.01 to 20% by weight of the at least one silane coupling agent, (d) 5 to 20% by weight of the multifunctional compound and (e) 1 to 20% by weight of the epoxy compound in values relative to blend conversion (provided that the total amount of (b) to (e) above does not exceed 30% by weight), orienting the crosslinkable liquid crystal compounds contained in the liquid crystal coating film, and then irradiating the surface of the liquid crystal coating film with active radiation rays to start crosslinking polymerization of the crosslinkable liquid crystal compounds with each other, and further baking the above crosslinked liquid crystal film, and
    the pencil hardness of the phase difference layer is 2H or higher in accordance with the evaluation criteria of JIS K 5600-5-4.

18. A color filter produced by directly or indirectly laminating a colored layer and a phase difference layer on a transparent substrate in this order, wherein the phase difference layer is formed by directly applying a composition onto the colored layer to form a liquid crystal coating film, the composition comprising the liquid crystal composition of claim 1 together with a photopolymerization initiator such that the composition contains at least (a) 70 to 93.89% by weight of the at least one crosslinkable liquid crystal compound, (b) 0.1 to 10% by weight of the photopolymerization initiator, (c) 0.01 to 20% by weight of the at least one silane coupling agent, (d) 5 to 20% by weight of the multifunctional compound and (e) 1 to 20% by weight of the epoxy compound in values relative to blend conversion (provided that the total amount of (b) to (e) above does not exceed 30% by weight), orienting the crosslinkable liquid crystal compounds contained in the liquid crystal coating film, and then irradiating the surface of the liquid crystal coating film with active radiation rays to start crosslinking polymerization of the crosslinkable liquid crystal compounds with each other, and further baking the above crosslinked liquid crystal film, and the detachment strength of the phase difference layer is 0 or 1 in accordance with the evaluation criteria of HS K 5600-5-6.

19. The colored filter according to claim 15, wherein the phase difference layer is homeotropically oriented.

20. A liquid crystal display apparatus, comprising:

the color filter recited in claim 15; and a driving circuit side substrate provided with at least liquid crystal driving electrodes on a transparent substrate, wherein the color filter and the driving circuit side substrate face each other with the phase difference layer and the liquid crystal driving electrodes being inside, and a driving liquid crystal material is enclosed between the color filter and the driving circuit side substrate.

21. The liquid crystal composition according to claim 1, wherein the multifunctional compound is other than the liquid crystal compound and the epoxy compound, and the epoxy compound is other than the liquid crystal compound and the multifunctional compound.

22. The liquid crystal composition according to claim 1, wherein the at least one polymerizable functional group is one of (meth)acrylate groups, epoxy groups and oxetane groups in a molecular structure of the multifunctional compound.

* * * * *